United States Patent [19]
Chen et al.

[11] Patent Number: 5,710,829
[45] Date of Patent: Jan. 20, 1998

[54] SYSTEM AND METHOD FOR FOCUSED-BASED IMAGE SEGMENTATION FOR VIDEO SIGNALS

[75] Inventors: Tsuhan Chen, Middletown; Cassandra Turner Swain, Eatontown, both of N.J.

[73] Assignee: Lucent Technologies Inc., Murray Hill, N.J.

[21] Appl. No.: 429,458

[22] Filed: Apr. 27, 1995

[51] Int. Cl.$^6$ .................................... G06T 9/20
[52] U.S. Cl. .................. 382/173; 382/236; 382/255; 382/282
[58] Field of Search ................ 382/173, 174, 382/236, 239, 242, 243, 325, 199, 205, 255, 282, 279; 348/345, 352, 353, 354, 356; 250/563

[56] References Cited

U.S. PATENT DOCUMENTS

| | | | |
|---|---|---|---|
| 4,173,772 | 11/1979 | White | 358/213 |
| 4,339,769 | 7/1982 | Fujita et al. | 358/6 |
| 4,371,894 | 2/1983 | Camras | 358/342 |
| 4,418,365 | 11/1983 | Camras | 358/342 |
| 4,876,457 | 10/1989 | Bose | 250/563 |
| 5,103,488 | 4/1992 | Gemello et al. | 382/22 |
| 5,225,940 | 7/1993 | Ishii et al. | 359/823 |
| 5,231,514 | 7/1993 | Nakamura | 358/444 |
| 5,258,858 | 11/1993 | Chow | 358/484 |
| 5,307,175 | 4/1994 | Seachman | 358/401 |
| 5,327,231 | 7/1994 | Krummey et al. | 348/19 |
| 5,329,399 | 7/1994 | Ho | 359/662 |
| 5,339,108 | 8/1994 | Coleman et al. | 348/408 |
| 5,341,441 | 8/1994 | Maeda et al. | 382/56 |
| 5,537,494 | 7/1996 | Toh | 382/242 |

OTHER PUBLICATIONS

Ebrahimi, Touradj, "A New Technique for Motion Field Segmentation and Coding for Very Low Bitrate Video Coding Applications," Proc. IEEE Int. Conf. on Image Processing, 1994, pp. 433–37.

Haralick, Robert M., and Shapiro, Linda G.. "Image Segmentation Techniques," Academic Press Inc., 1985, pp. 100–132.

Krotkov, Eric. "Focusing," International Journal of Computer Vision, 1, pp. 223–237.

Peleg, Shmuel, and Rom, Hillel, "Motion Based Segmentation," Proc. IEEE Int. Conf. Computer Vision and Pattern Recognition, 1990, pp. 109–113.

Pentland, Alex Paul, "A New Sense for Depth of Field," IEEE Transaction s On Pattern Analysis And Machine Intelligence, vol. Pam-9, No. 4, Jul. 1987, pp. 523–531.

Pratt, William K., *Digital Image Processing*, Ch. 16, "Edge Detection," Second Edition, John Wiley & Sons, Inc., 1991, pp. 491–556.

Swain, C., et al., "Accuracy Improvement of Depth Estimation using Fuzzy Logic," Technical Report No. CIS 94–02. Center for Intelligent Systems, Vanderbilt University, Nashville, TN 37235, May 1994.

Waldowski, Michael, "A New Segmentation Algorithm for Videophone Applications Based on Stereo Image Pairs, " IEEE Transactions On Communications, vol. 39, No. 12, Dec. 12, 1991, pp. 1856–1868.

*Primary Examiner*—Leo Boudreau
*Assistant Examiner*—Brian P. Werner

[57] ABSTRACT

Motion video is represented by digital signals. The digital signals can be compressed by coding to reduce bitrate and thus save time and expense in transmitting and reproducing the video. The present invention is a system and method for reducing the amount of information required to satisfactorily reproduce video signals by distinguishing more pertinent portions of the video from less pertinent portions. In particular, edges are detected based on amplitude variations in the luminance characteristic of the picture elements. Sharp edges are deemed to be "focused". The portion of the video frame between the focused edges is deemed to be focused, as well. A template is created corresponding to the focused portion. A signal corresponding to the outline of the template is combined with the original frame signal to create a segmented frame signal. When motion detection information is available, a motion-based template may be created and intersected with the focus template. A signal corresponding to the outline of the intersected template may be transmitted with the frame signal as the segmented frame signal.

37 Claims, 6 Drawing Sheets

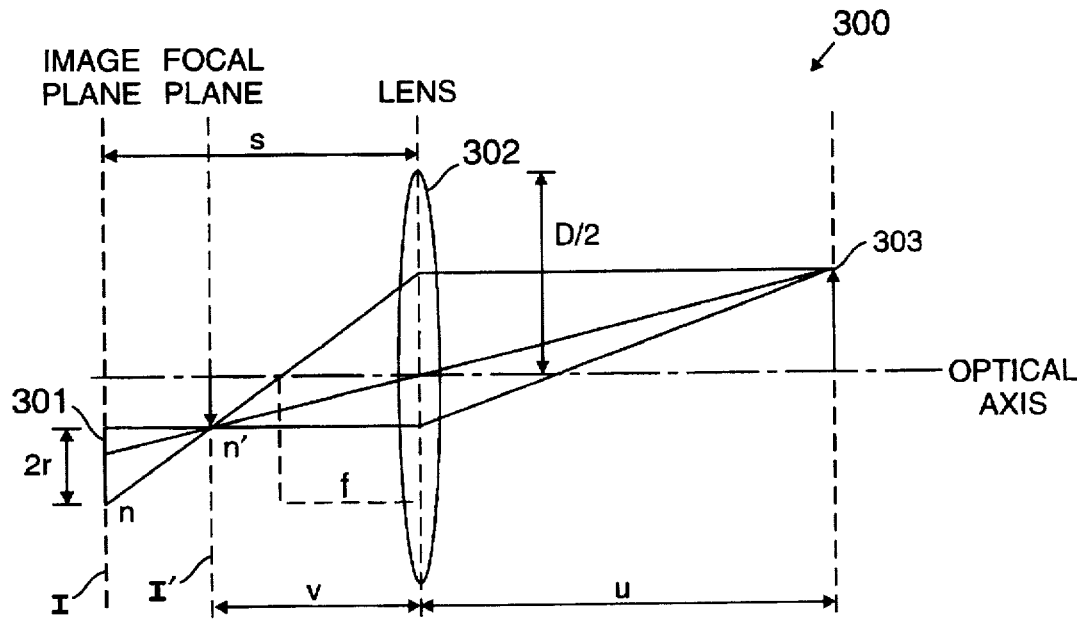
FIG. 4
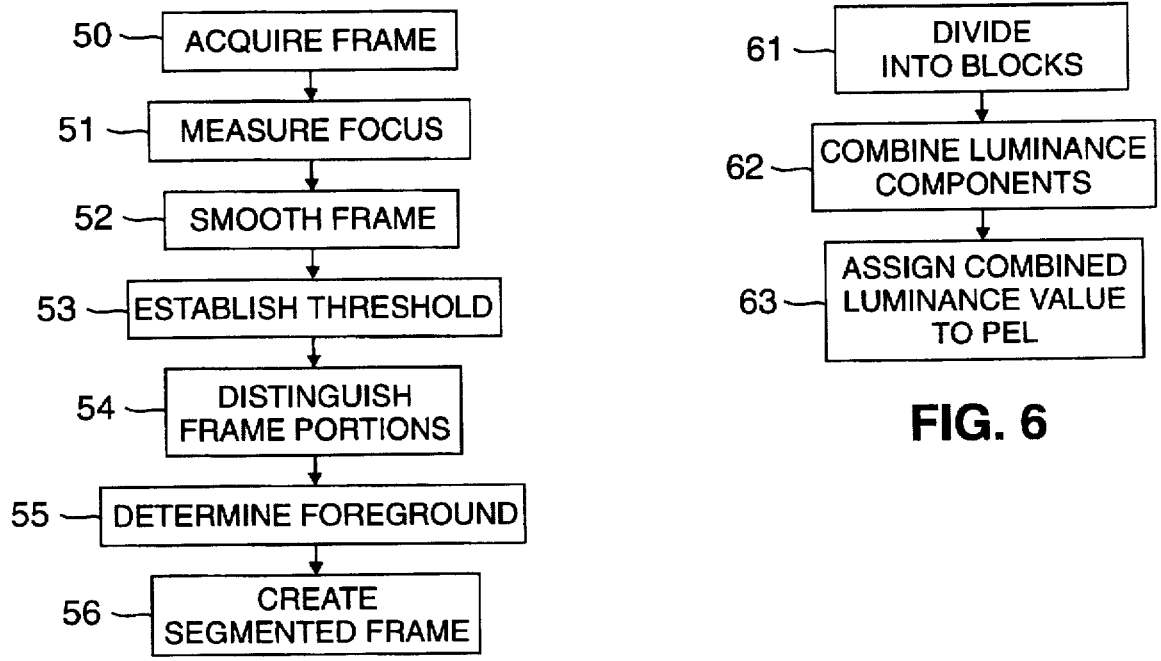
FIG. 5
FIG. 6

SYSTEM AND METHOD FOR FOCUSED-BASED IMAGE SEGMENTATION FOR VIDEO SIGNALS

A portion of the disclosure of this patent document is subject to copyright protection. The copyright owner has no objection to the facsimile reproduction by anyone of the patent disclosure, as it appears in the Patent and Trademark Office patent files or records, but otherwise reserves all copyright and other rights whatsoever.

FIELD OF THE INVENTION

The systems and methods of the present invention relate to the field of digital motion video signal processing and, in particular, to a system and a method useful for segmenting video signals into foreground and background to create a segmented video frame signal and permit more efficient video coding.

BACKGROUND OF THE INVENTION

Motion video can be represented by a digital signal in which a series of bits of information represent each video frame. As more bits of information are required to represent each frame, the cost and complexity of the hardware necessary to process the signals as well as the time required to process, store and transmit the signal are increased.

Image compression is a process which allows the digital signals representing images, such as frames of a motion video, to be transmitted in a coded form over a communications channel or to be stored on a medium, such as a CD-ROM, using fewer bits of data than would be required for an uncoded image. Because the storage and transmission of digital video signals is central to many applications, and because video signals requiring a large bitrate require more time and more equipment to process, either in storage or transmission, techniques to reduce the bitrate of digital video signals are vital to this advancing art.

To reduce the total amount of information required to reproduce a video image sequence (and thus the cost in time and equipment to reproduce the sequence), frames may be segmented into more pertinent portions and less pertinent portions. The data concerning the more pertinent portion is transmitted more frequently and/or at a higher resolution that the data concerning the less pertinent portion. Consequently, less information needs to be transferred than if all the data was transmitted at a higher rate. This also permits transmission of the signal for the video over a smaller bandwidth than if all the data was transmitted.

The primary segmentation techniques are motion-based segmentation (see S. Peleg & H. Rom, "Motion-Based Segmentation", Proc. IEEE Int'l Conf. Computer Vision and Pattern Recognition 109–113 (1990)), intensity-based segmentation (see R. Haralick and L. Shapiro, "Image Segmentation Techniques," 2 Computer Graphics, Vision, and Image Processing 100–32 (1985)), and disparity-based segmentation (see M. Waldowiski, "A New Segmentation Algorithm for Videophone Applications based on Stereo Image Pair," 39 IEEE Tran. Communication 1856–68 (1981)). The motion-based approach segments objects in a frame with similar velocities. This approach fails for scenes containing both foreground and background motion, causing the less-pertinent background to be treated as more pertinent. The intensity-based approach segments pictures based on intensity contrast and spatial position. This approach fails for textured objects because a single object may be segmented erroneously into multiple objects. The disparity-based approach measures the disparity between stereo images to segment objects. Point correspondence between the images is required to measure disparity but this is a complex and error-prone task. Consequently, none of these segmentation techniques are completely satisfactory.

In a typical video frame, the foreground contains more important information than the background. Consequently, it is desirable to transmit information corresponding to the foreground at a higher resolution or more frequently than background information. Each video frame is composed of picture elements, or "pixels," or "pels." Image focus (or its inverse, image defocus) is a measure of image sharpness for a portion of a frame, such as a pel or a block of pels. Image focus is measured easily from components having high frequencies, such as sharp edges: the less blurred an edge, the higher the focus. Consequently, the portion of the frame that is in focus can be determined by locating the edges that are less blurred. Assuming that the focused edges outline the foreground, the frame can be segmented into foreground (focused) and background (not focused or "defocused"). The foreground then can be treated as more pertinent and the background as less pertinent, transmitting or encoding only the foreground at a higher resolution or a higher frequency, thereby saving bitrate.

SUMMARY OF THE INVENTION

The present invention relates to a method and an apparatus for creating a segmented frame based on the focus measurement of portions of an original frame. A signal is acquired corresponding to an original frame. The original frame is composed of blocks and each block has an image attribute. The image attribute of each block is compared to the image attribute of another block. Each block is assigned a focus measurement based on the comparison of image attributes. The focus measurement of each block is then compared to a threshold focus measurement. Blocks that have a focus measurement above the threshold are designated as focused. Blocks that have a focus measurement below the threshold are designated as defocused. A segmented frame is then created based on the original frame and the designations as focused or defocused. Motion-based image segmentation may be employed in conjunction with focused-based segmentation to provide a combined motion/focus segmented frame.

The invention may be employed in a processing means that operates to process a digital signal corresponding to an original frame to generate the output signal corresponding to a segmented frame. An important aspect of any apparatus in accordance with the present invention is that it may be a processing system, firmware or hardware based.

One embodiment for using and/or distributing the present invention is as software. The software embodiment includes a plurality of processing system instructions which are stored to a storage medium. Preferred storage media include without limitation magnetic, optical, or semiconductor media, as well as suitably arranged combinations thereof. The processing system instructions are readable by a processing system, and upon execution, operate to control at least one processing system for segmenting a signal corresponding to an original frame using techniques in accordance with the principles of the present invention.

BRIEF DESCRIPTION OF THE DRAWINGS

For a more complete understanding of the present invention, and the advantages thereof, reference is now made to the following Detailed Description of the Invention, taken in conjunction with the accompanying drawings in which like numbers designate like parts, and in which:

FIG. 4 is a schematic view of a simple lens model 300 upon which focus measurement theory is based;

FIG. 5 is a block diagram illustrating the overall operation of the prefilter 30 of the present invention;

FIG. 6 is a block diagram illustrating the initial smoothing operation performed at block 52 of the prefilter 30 of the current invention;

DETAILED DESCRIPTION

Figure 1:
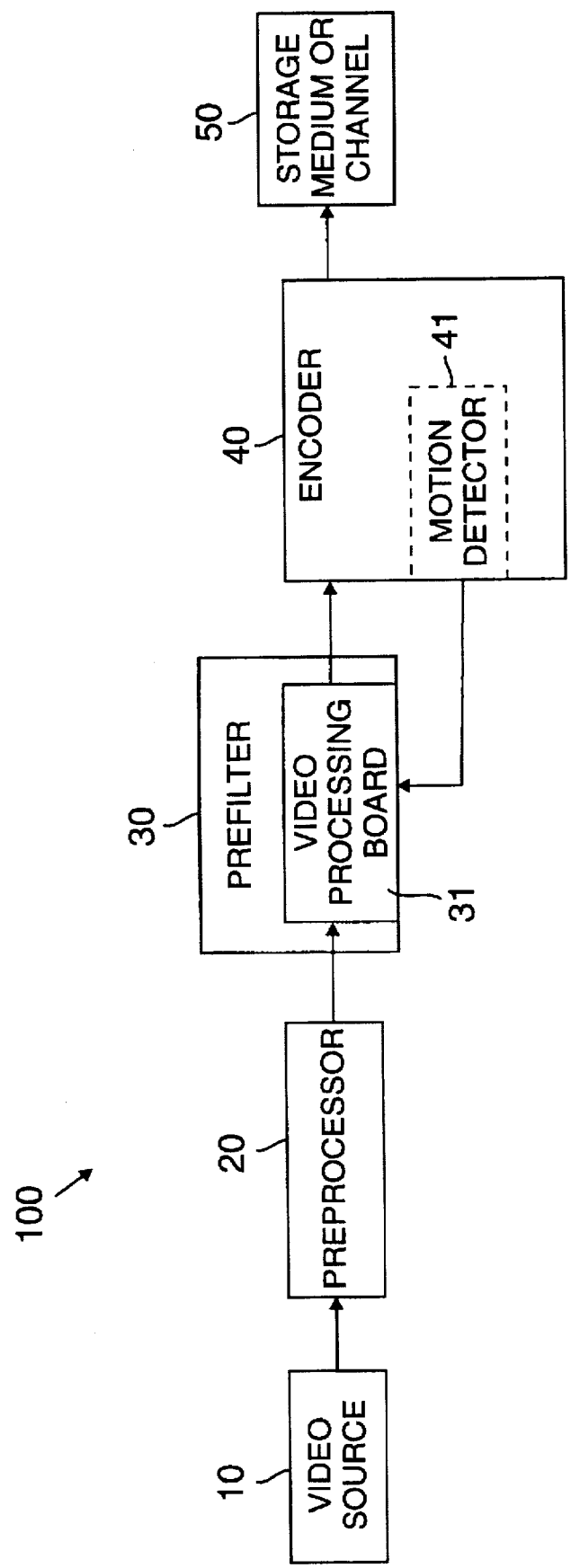
FIG. 1 is a block diagram of an embodiment of a motion video encoding system 100 of the invention.

FIG. 1 is a block diagram of an embodiment of a motion video encoding system 100 of the invention. An analog video signal is generated at a video source 10, such as a video camera or a laser disc player, for a series of n pictures. The analog signal $P_n$ proceeds from the source 10 to a preprocessor 20, which includes an analog to digital converter, where the analog signal is transformed into a digital signal ("original frame signal"), representing a series of n frames. If necessary, the digital signal can be further converted by the preprocessor 20 to a digital signal with appropriate resolution as may be required depending on whether the signal will be sent over a communications channel or will be stored on a digital medium, such as a CD-ROM.

Each video frame of motion video comprises a matrix of picture elements, or "pels" or "pixels," f(x,y). Each frame is divided into a variable number of blocks depending on the number of pels per frame and the size of the blocks. As currently preferred, each block comprises a 4×4 matrix of pels. Of course, the blocks can comprise a different number and arrangement of pels. In particular, each block can comprise a single pel. Each pel comprises a luminance pel, Y, and two chrominance pels, $C_b$ and $C_r$. When the video signal is in digital form, each attribute or component of a block is represented by a numerical value. When blocks are "compared," it is the value of the corresponding block components or attributes that are compared.

A prefilter 30, including a computer processor such as a video processing board 31, is connected to the preprocessor 20 and receives the original frame signal from the preprocessor as an input signal. The prefilter 30 operates in accord with the present invention to segment the frame signal into foreground and background, thereby creating an output signal ("segmented frame signal") corresponding to a segmented frame. The segmented frame may be transmitted to an encoder 40, such as an H0.261 or MPEG encoder, which translates the signal for the segmented frame into a compressed video bitstream. The compressed video signal generated by the encoder 40 is then stored in a storage medium 50, such as on an CD-ROM, or transmitted through a channel, such as an ISDN link.

A motion detector 41, which may be part of the encoder 40, can be used to determine the extent to which each portion of the image is moving. Alternatively, the motion detector 41 may be a distinct piece of equipment, or may be incorporated into the prefilter 30. As discussed more fully below with respect to FIG. 12, the motion information generated by the motion detector 41 can be transferred to the prefilter 30 for use in further refining the segmented frame signal. As shown in FIG. 1, the encoder 40 is a distinct piece of equipment. However, it is understood that, typically, the encoder 40 and a decoder (not shown) are collectively called a codec, as is known in the art.

The encoder 40 creates the compressed signal using well-known compression techniques, e.g., the CCITT (Consultative Committee on International Telegraphy and Telephony) Recommendation H0.261, Draft Revised Recommendation H0.261-Video Codec for Audiovisual Services at px64 kbit/s, Study Group XV-Report R95 (May 1992), incorporated herein by reference, and the ISO/IEC MPEG standard. The H0.261 by CCITT is a coding standard for audio-visual services at px64 kbit/s transmission rate. It has applications in videophone, videoconference and other audio visual transmission over ISDN networks. The MPEG algorithms, which include MPEG1 and MPEG2, have been developed by the Moving Picture Experts Group (MPEG), part of a joint technical committee of the International Standards Organization (ISO) and the International Electrotechnical Commission (IEC). The MPEG1 standards, as set forth in ESO-IEC JTC1SC2/WG11MPEG CD-11172 Committee Draft, 1991, are included as a part of MPEG2, as set forth in ISO-IEC JTC1/SC29/WG11/602 Committee Draft, 1993, incorporated herein by reference. The MPEG standards are intended for high quality digital video storage and high quality digital video transmission over a broadband network.

The present invention is presently intended for use with either an H0.261 codec or an MPEG codec. It is to be noted, however, that the invention can also be applied to codecs using other video coding algorithms which share pertinent features of the H0.261 or MPEG algorithm, as one skilled in the art would understand.

Figure 2:
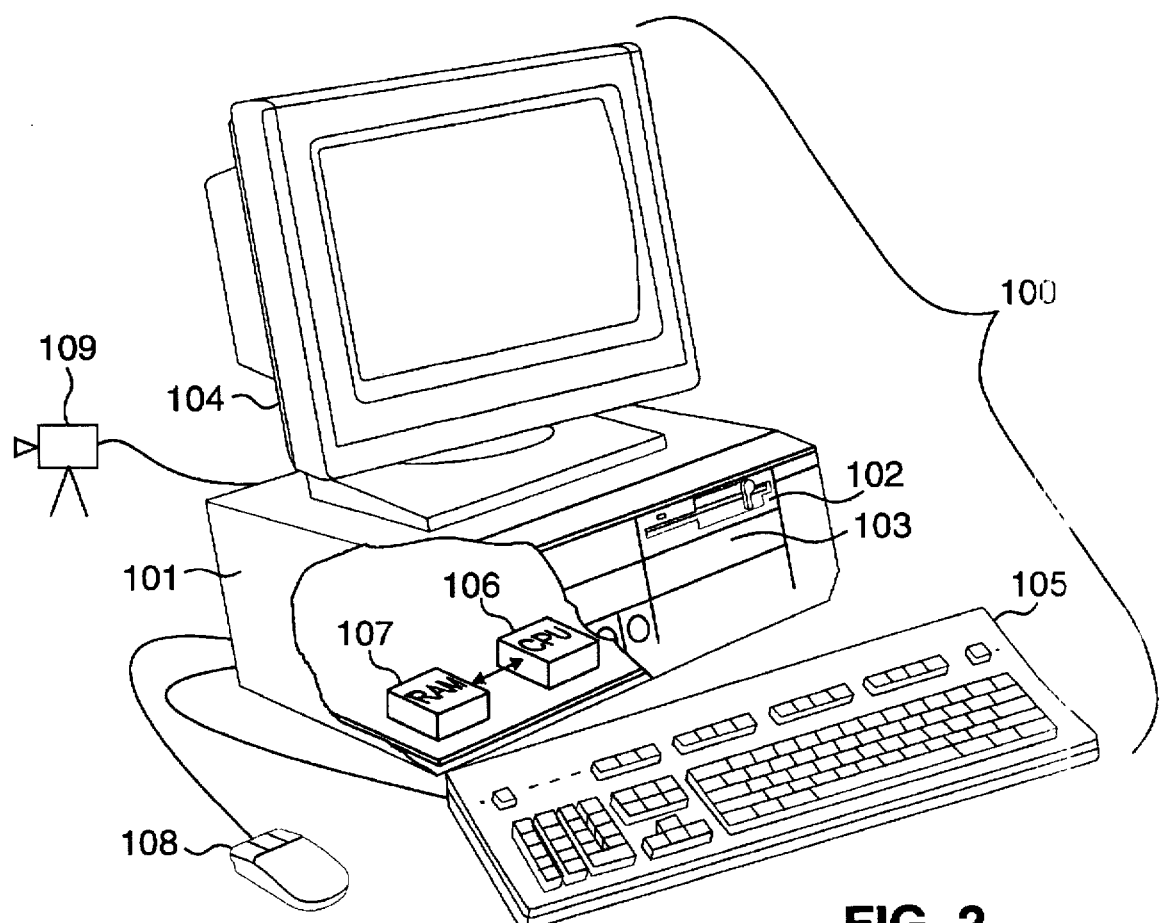
FIG. 2 illustrates an isometric view of one exemplary processing system for compressing video data in accordance with the principles of the present invention.

FIG. 2 is an isometric view of one exemplary processing system for compressing video data in accord with the principals of the present invention. Processing system 100 is shown as a personal computer, and in one preferred embodiment is a model no. System 3333, by AT&T GIS, located in Dayton, Ohio. Processing system 100 may suitably be coupled with camera 109, and includes a hardware casing 101, having both a floppy disk drive 102 and a hard disk drive 103, a monitor 104 and a keyboard 105. Monitor 104 and keyboard 105 may be replaced by, or combined with, other conventional output devices and input devices.

Floppy disk drive 102 is operable to receive, read and write to external disks. Hard disk drive 103 is operable to provide fast access storage and retrieval. Floppy disk drive 102 may be replaced by or combined with any conventional suitably arranged structure for receiving and transmitting data and instructions, including without limitation, tape and compact disc drives, telephony systems and devices (including videophone technologies), and serial and parallel ports. In alternate embodiments, circuit boards, such as video processing board 31 of FIG. 1 for example, may be included.

The video source of 10 of FIG. 1 may include the camera 109 coupled with processing system 100 through one of the aforementioned ports. In alternate embodiments, input video frames may be received via one or more separate storage devices, such as a floppy disk or a compact disc, for example. An important aspect of the exemplary embodiment therefore is that data and/or instruction collection and segmentation need not occur coincidentally.

Note that hardware casing 101 is illustrated with a cutaway portion which includes a processing unit 106 suitably coupled with a memory storage device 107. Memory storage device 107 may be a random access memory ("RAM"), such as DRAM and/or SRAM memory storage devices, for example, or a read only memory ("ROM"), or other conventional suitably arranged memory storage devices. Although processing system 100 is illustrated as having a single processing unit, a single hard disk drive and a single memory unit, processing system 100 may be equipped with a plurality of processing units and/or suitably arranged memory storage devices operable to cooperatively carry out the principles of the present invention.

It should be noted that although the present invention is particularly advantageous for use in video compression, the present invention is also well-suited for use with other systems utilizing signal compression, including without limitation, processing system networks (including local and wide area networks), telephony systems (including videophone technologies), direct television systems, satellite systems, land-mobile radio systems, broadcast systems, information storage/retrieval systems, and the like.

Although a personal computer is utilized to illustrate one exemplary processing system embodiment, the principles of the present invention may be implemented within any processing system having conventional suitably arranged processing means for performing segmentation in accordance with the principles of the present invention, including without limitation, cameras, videophones, telephones, televisions, sophisticated calculators and, hand-held, laptop/ notebook, mini, mainframe and super computers, including RISC and parallel processing architectures, as well as within processing system network combinations of the foregoing. Conventional processing system architecture is discussed more fully in William Stallings, *Computer Organization and Architecture* (MacMillan Publishing Co., 3rd ed. 1993), which is incorporated herein by reference.

Other preferred embodiments of the present invention include, without limitation, implementations in firmware or hardware. Such exemplary embodiments may include suitably arranged circuitry, including programmable logic devices, such as PALs (programmable array logic), PLAs (programmable logic arrays) and DSPs (digital signal processors). Other exemplary embodiments may also include FPGAs (field programmable gate arrays) and ASICs (application specific integrated circuits), for example.

Figure 3:
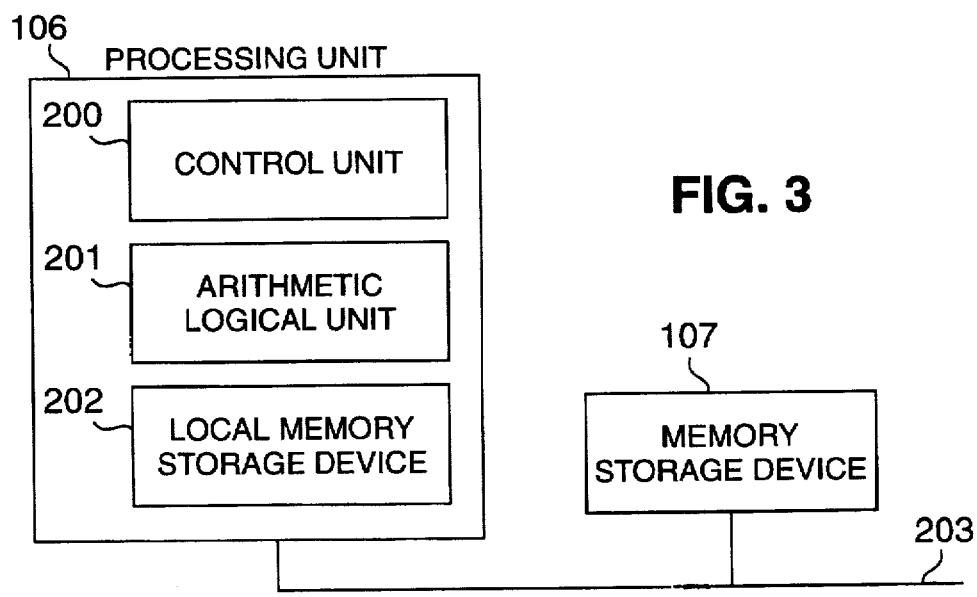
FIG. 3 illustrates a block diagram of an exemplary microprocessing system which may be utilized in conjunction with the processing system of FIG. 2.

FIG. 3 illustrates a block diagram of one exemplary microprocessing system which may be utilized in conjunction with processing system 100. The microprocessing system may be programmed to segment frame signals using techniques in accordance with the principles of the present invention. The microprocessing system includes a single processing unit 106 coupled via data bus 203 with a single memory storage device 107. Memory storage device 107 is operable to store one or more processing system instructions which processing unit 106 is operable to retrieve and execute. Processing unit 106 includes a control unit 200, an arithmetic logic unit ("ALU") 201, and a local memory storage device 202, such as, stackable cache or a plurality of registers, for example. Control unit 200 is operable to fetch processing system instructions from memory storage device 107. ALU 201 is operable to perform a plurality of operations, including addition and Boolean AND, needed to carry out those instructions. Local memory storage device 202 is operable to provide local high speed storage used for storing temporary results and control information.

The processing system 100 may be used to measure the focus of each block in the original frame for use in segmenting the frame signal, as discussed more fully below. It is known to use a "focus" measurement of a portion of a video frame, which is a function of depth, to determine object distances for monocular systems, such as camcorders. See A. Pentland, "A New Sense of Depth of Field," IEEE Trans. Pattern Analysis and Machine Intelligence, Vol. 9, No. 4, pp. 523–531, Jul. 1993, incorporated herein by reference; M. Subbarao and G. Surya, "Depth from Defocus: A Spatial Domain Approach," Technical Report No. 92.12.03, Computer Vision Laboratory, Electrical Engineering Department, SUNY, Stony Brook, NY, incorporated herein by reference; and C. Swain, M. Bishay, A. Peters, and K. Kawamura, "Accuracy Improvement of Depth from Defocus using Fuzzy Logic," Technical Report No. CIS-94-02, Center for Intelligent Systems, Vanderbilt University, Nashville, TN 37235, May 1994, incorporated herein by reference.

FIG. 4 is a schematic view of a simple lens model 300 upon which focus measurement theory is based. According to the lens law:

$$\frac{1}{f} = \frac{1}{u} + \frac{1}{v} \tag{1}$$

where f is the focal length, u is the distance between an object and the lens, and v is the distance between the lens and the focal plane. Object point 303 is not in focus because the image plane I of object point 303 is displaced from the focal plane I'. On the image plane, the object point 303 appears as a defocused or blurred image 301 called a blur circle. The blur circle size, 2r, and hence the amount of focus (or, conversely, defocus), can be expressed as a function of the depth u of the object point 303, as described in Equation (2):

$$\frac{1}{u} = \frac{1}{f} - \frac{1}{s} - \frac{2r}{sD} \tag{2}$$

where u is the distance between the object 303 and the lens 302, f is the focal length of the lens 302, s is the distance between the lens 302 and the image plane I, r is the radius of the blur circle 301 and D is the diameter of the lens 302.

The blurred image can be described by a convolution of the focused image with a point spread function h(x,y) ["PSF"]. Ideally, the PSF is a cylindrical circularly symmetric function of unit volume, called a pillbox. Within the pillbox, the brightness is uniform such that $$h(x,y) = \begin{cases} \frac{1}{\pi r^2} & \text{if } x^2 + y^2 \leq r^2 \\ 0 & \text{otherwise.} \end{cases} \tag{3}$$

However, due to lens aberration and diffraction, the brightness is not uniform, but falls off gradually toward the boundary. So, the PSF is defined by a two-dimensional Gaussian function.

$$h(x,y) = \left(\frac{1}{2\pi\sigma^2}\right) e^{-\frac{1}{2}\frac{x^2+y^2}{\sigma^2}} \quad (4)$$

where σ is a spatial constant corresponding to the defocus measurement. σ is proportional to the blur circle r such that:

$$\sigma = kr, \quad (5)$$

where k is a proportionality constant. The unit volume of the PSF is 1. It has been proven experimentally that:

$$k = \frac{1}{\sqrt{2}} \quad (6)$$

Substituting into eq. 2:

$$\frac{1}{u} = \frac{1}{f} - \frac{1}{s} - \frac{2\sqrt{2}\,\sigma}{sD} . \quad (7)$$

Rearranging, the distance u can be written as a function of the radius of the blurred circle r (or the defocus measurement σ):

$$u = \frac{sDf}{sD - Df - 2\sqrt{2}\,\sigma f} . \quad (8)$$

When an image is in focus, its edges will be sharp and clearly defined. Consequently, the value of σ at a focused edge will be lower. Similarly, the gradient of focus at a focused edge will also be higher because the image attributes of blocks proximate to the edge will vary greatly. In a blurred edge, the change of the image attributes across the edge will be smoother and, thus, the gradient will be smaller.

In accord with an embodiment of the present invention, the blocks of a frame signal are segmented into foreground and background based on the depth measurement of each block. In particular, focused edges are detected. These edges are assumed to border the foreground portion of the frame. An outline is created from the focused edges. A signal including information concerning the outline and the original frame signal is created and sent to an encoder in which the foreground may be treated as more pertinent and the background treated as less pertinent.

FIG. 5 is a block diagram illustrating the overall operation of the prefilter 30 of the present invention. An original frame signal is acquired at block 50. The focus of each block is measured at block 51 in a manner known in the art, thereby creating a focus gradient. The original frame signal may be smoothed at block 52. Alternatively, the smoothing done at block 52 could be performed before the focus is measured, or at other points in the segmentation, or not at all. A threshold focus value is established at block 53. The focus value of each block is compared to the threshold focus value at block 54 to distinguish the focused blocks from the defocused blocks. Blocks having a focus value above the focus threshold are designated focused; blocks having a focus value below the focus threshold are designated defocused. The foreground is determined at block 55 based on the focused blocks. A segmented frame signal is created at block 56 based on the foreground.

FIG. 6 is a block diagram illustrating the initial smoothing operation performed at block 52 by the prefilter 20 of the current invention. The original frame is divided into blocks, preferably comprising a 4×4 matrix of pels, at block 61. Each pel may be assigned to more than one block such that there is block overlap. The luminance component of each pel is combined with the luminance component of each other pel in the block at block 62, as is known in the art. The combined luminance value is assigned to the location of one of the pels in the block as is known in the art. This process is continued for each block until each pel has been assigned a combined luminance value, thereby creating a smoothed frame signal.

The focus of each block in the original frame is measured at block 51. The focus measurement of each block may be determined in a traditional manner from edge strength, as explained in E. Krotov, "Focusing," 1 Intl J. Com. Vision 223–37 (1987), incorporated herein by reference, or W. Pratt, Digital Image Processing 491–508 (Wiley & Sons 2d ed. 1991), incorporated herein by reference. As currently preferred, Sobel edge detection is employed.

Edges of a focused image in a frame will be indicated by changes or discontinuities in an image amplitude attribute across adjacent blocks. In particular, a gradient of the attribute is calculated. A spike or high value in the gradient is indicative of an edge. Since edges distinguish the foreground (which is focused) from the background (which is defocused), the attribute gradient is a gradient of focus or focus gradient. As currently preferred, the apparatus and method of the present invention detect edges based on changes or discontinuities in the luminance component of the blocks. Of course, changes or discontinuities in other image attributes could also be used to detect edges and still practice this invention.

The focus gradient along a selected line over a frame f(x,y) comprising a matrix of XxY pels is defined as:

$$G(x,y) = \frac{\partial f(x,y)}{\partial x} \cos\theta + \frac{\partial f(x,y)}{\partial y} \sin\theta \quad (9)$$

where G(x,y) is the focus gradient, f(x,y) is the frame signal and θ is the angle of the line with respect to the horizontal axis. The focus gradient may be broken up into rows and columns such that the row gradient is defined as follows:

$$G_r(x,y) = f(x,y) - f(x,y-1) \quad (10)$$

The column gradient is defined as follows:

$$G_c(x,y) = f(x,y) - f(x-1,y). \quad (11)$$

Preferably, a Prewitt square root edge gradient, using a 3×3 pel edge gradient operator, is employed such that:

$$G(x,y) = \{[G_r(x,y)]^2 + [G_c(x,y)]^2\}^{1/2} \quad (12)$$

where G(x,y) is the focus gradient, $G_r(x,y)$ is a row gradient, and $G_c(x,y)$ is a column gradient. The row gradient, $G_r$, is defined as follows:

$$G_r(x,y) = \frac{1}{K+2} [(A_2 + KA_3 + A_4) - (A_0 + KA_7 + A_6)] \quad (13)$$

The column gradient, $G_c$, is defined as follows:

$$G_c(x,y) = \frac{1}{K+2} [(A_0 + KA_1 + A_2) - (A_0 + KA_5 + A_4)] \quad (14)$$

where $A_0 = a_0 f(x-1, y+1)$
$A_1 = a_1 f(x, y+1)$
$A_2 = a_2 f(x+1, y+1)$
$A_3 = a_3 f(x+1, y)$
$A_4 = a_4 f(x+1, y-1)$
$A_5 = a_5 f(x, y-1)$ $A_6=a_6f(x-1, y-1)$ $A_7=a_7f(x-1, y)$ The weighting factor $a_n$ is an empirically selected constant.

More generally, the luminance focus gradient G(x,y) over a continuous domain edge segment may be obtained by convolving the luminance values of the pels with an impulse response array as follows:

$$G(x,y)=F(x,y) * H(x,y).  \quad (15)$$

where F(x,y) is the luminance matrix for the frame, f(x,y), and H(x,y) is an impulse response array. Breaking this up into columns and rows, $$G_r(x,y)=F(x,y)*H_r(x, y) \quad (16)$$

and $$G_c(x,y)=F(x,y)*H_c(x,y) \quad (17)$$

Numerous impulse response arrays can be selected for use with the point spread function, including pel difference, separated pel difference, Roberts, Prewitt and Frei-Chen impulse response arrays. Preferably, a Sobel impulse response array is employed. The Sobel impulse response arrays are as follows: Row Gradient:

$$H_r = \frac{1}{4}\begin{bmatrix} 1 & 0 & -1 \\ 2 & 0 & -2 \\ 1 & 0 & -1 \end{bmatrix} \quad (18)$$

Column Gradient:

$$H_c = \frac{1}{4}\begin{bmatrix} -1 & -2 & -1 \\ 0 & 0 & 0 \\ 1 & 2 & 1 \end{bmatrix} \quad (19)$$

When the Sobel impulse response array is employed, the focus gradient, G(x,y), may be represented by S(x,y), a Sobel gradient. The value of the Sobel gradient at each pel is determined and an XxY matrix of Sobel gradient focus measurements is established. To improve the performance of the edge gradient generation operator, particularly in high noise environments, the neighborhood can be extended from a 3×3 matrix to a larger matrix.

Using traditional focus measurement or edge detection techniques, such as the Sobel gradient discussed above, may result in errors in edge detection. Focused edges with low magnitudes and defocused edges with high magnitudes may give similar focus measurements. The defocused edges, however, should have lower defocus measurements as follows. These results can be improved by modifying the focus measurement. A distinguishing feature between focused and defocused edges is edge width. Focused edges have steeper intensity gradients and smaller widths than defocused edges. The focus measurement may be modified as follows:

$$d(x,y) = \frac{\Sigma_x \Sigma_y |S(x,y)|^2}{w} \quad (20)$$

where d(x,y) is the focus measurement, S(x,y) is the magnitude of Sobel edge detection on a frame f(x,y), and w is the edge width in frame f(x,y). The width of an edge is calculated by counting the number of pels in an edge in the vertical direction and in the horizontal direction. The median horizontal and vertical widths are determined. An average width is calculated from the median vertical width and the median horizontal width. This average is used as the edge width. As the width of the edge increases (an indication of defocus), the focus measurement d(x,y) decreases. Consequently, an edge that has a high magnitude will not automatically be designated a focused edge. Rather, if the edge is wide, it will have a lower focus measurement. If the edge is narrow, it will have a higher focus measurement.

A value from 0 to 255 is assigned to each block based on the value of the Sobel focus measurement. A threshold focus measurement for the focus gradient is established at block 53. This threshold can be a predetermined value, or can be established based on the desired information transmission rate. For example, due to bandwidth restrictions, it may be required that only a certain percent of the frame be designated as pertinent and transmitted at the higher rate. Consequently, the threshold may be selected such that the foreground template (discussed more fully below) corresponds to that percent.

Figure 7:
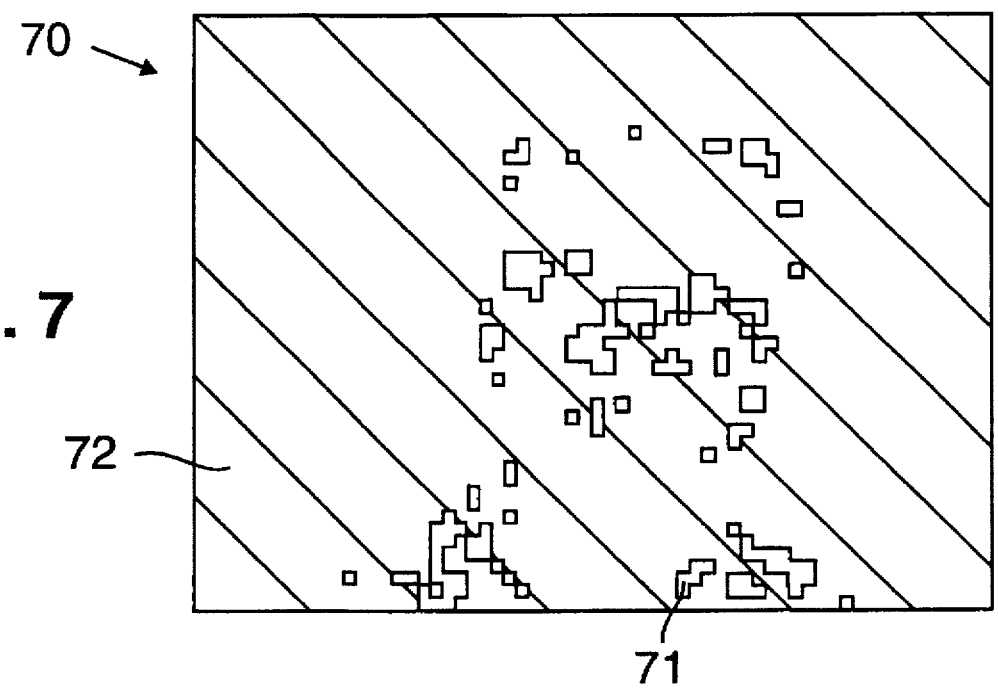
FIG. 7 is an initial bilevel focus measurement frame 70.

Portions of the frame are distinguished between focused and defocused at block 54 of FIG. 5. FIG. 7 is an initial bilevel focus measurement frame 70. A bilevel operation is performed on the output of the Sobel operator. Any block having a focus measurement above the threshold is defined as focused. Any block having a focus measurement below the threshold is defined as defocused. In FIG. 7, the focused blocks are depicted as white (e.g., pel 71) and the defocused blocks are lined as black (e.g., pel 72). Consequently, each block is determined to be either focused or defocused. As currently preferred, a single threshold is employed and the frame is distinguished between focused and defocused portions. Alternatively, a second threshold could be employed such that defocused, focused and intermediate portions are established. Each portion type could be transmitted at a different bitrate or different frequency, as is desired for the particular application. Of course, any number of such thresholds could be employed, segmenting the frame into various levels of focus.

Figure 8:
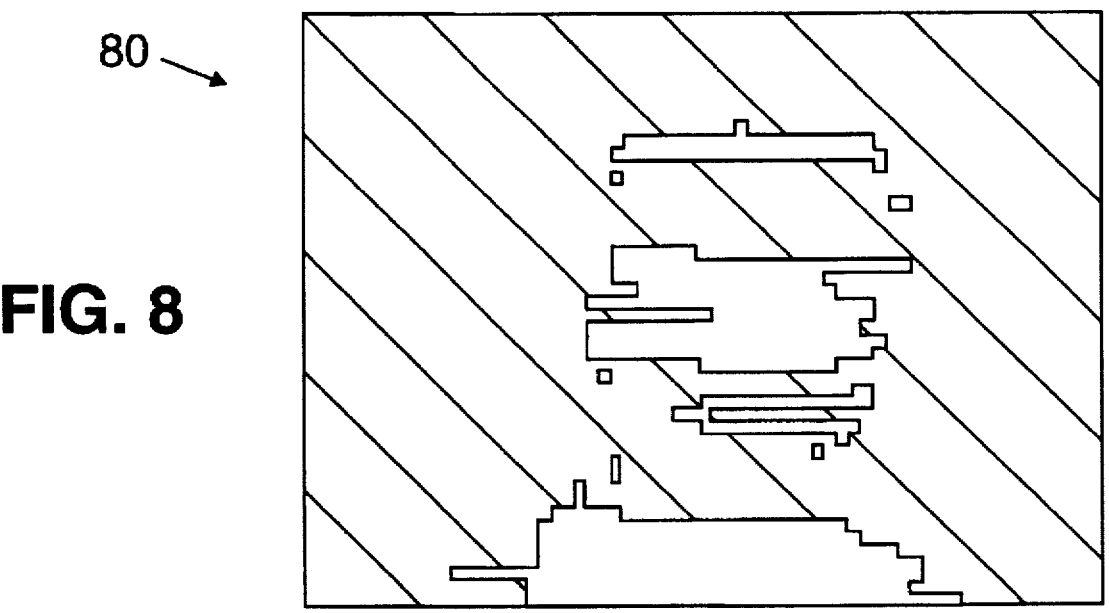
FIG. 8 is a bilevel focus measurement frame 80 after a horizontal fill was performed on the initial bilevel focus measurement frame.
Figure 9:
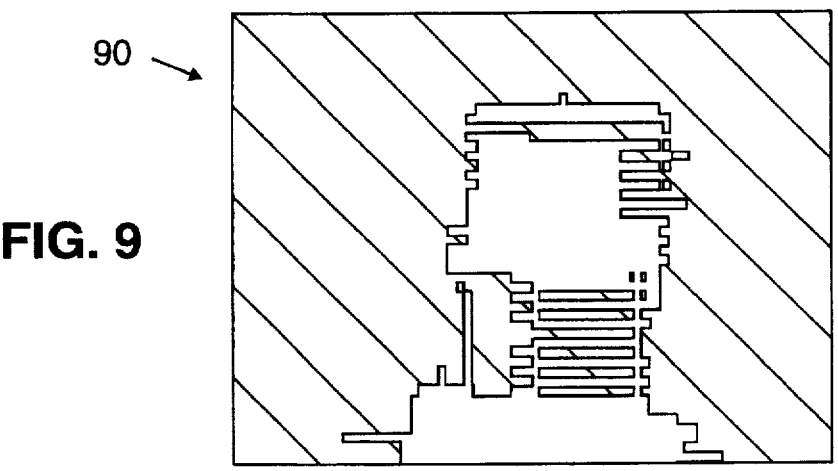
FIG. 9 is a bilevel focus measurement frame 90 after a vertical fill was performed on the bilevel focus measurement frame of FIG. 8.
Figure 10:
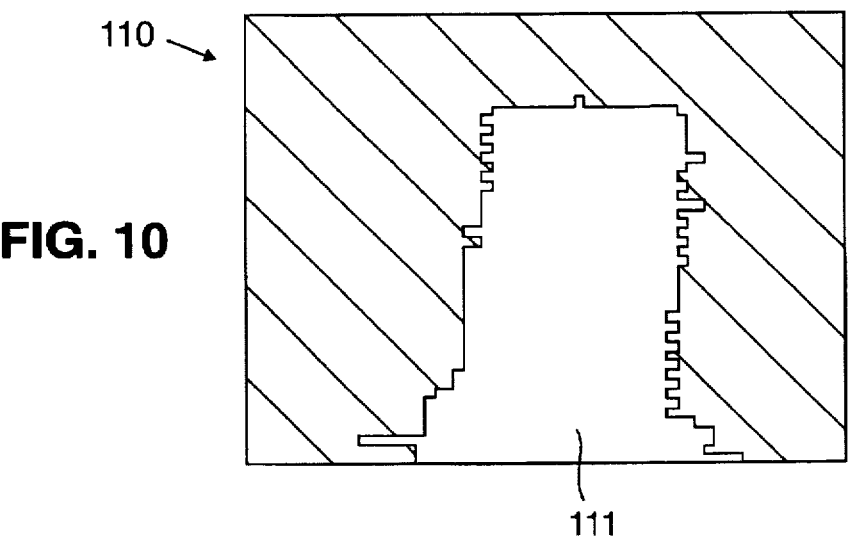
FIG. 10 is a bilevel focus measurement frame 110 after the filling operations have stabilized.

The portion of the frame to be designated foreground is determined at block 55 of FIG. 5. Preferably, regions of the frame between the focused blocks of FIG. 7 are also designated as focused, thereby creating a contiguous template. The template overlays the portion of the frame to be designated foreground. FIG. 8 is a bilevel focus measurement frame 80 after a horizontal fill was performed on the initial bilevel focus measurement frame. Horizontal bands are inserted between focused blocks that are situated at the same horizontal level. FIG. 9 is a bilevel focus measurement frame 90 after a vertical fill was performed on the bilevel focus measurement frame 80 of FIG. 8. Vertical bands are inserted between focused blocks that are situated at the same vertical level. The horizontal and vertical fill steps are reiterated until the image stabilizes. FIG. 10 is a bilevel focus measurement frame 110 after the filling operations have stabilized. The stabilized image is the foreground template 111. The foreground template could be generated in other ways, of course. For example, fixed shapes could be fit onto the focused blocks of FIG. 8 to create an estimate of the focused region. This, or other template generation techniques may be employed to save computational time.

Figure 11:
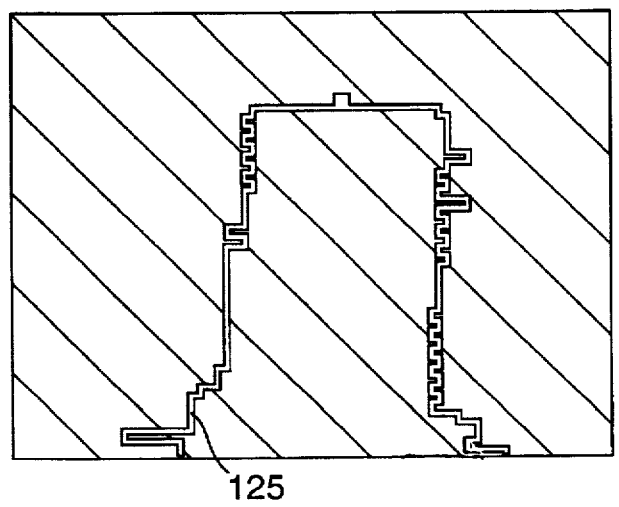
FIG. 11 is a bilevel focus measurement frame showing an outline 125 of the template 111 of FIG. 10.

An outline of the foreground template 111 is then generated. The blocks at the periphery of the foreground template 111 shown in FIG. 10 are designated as the outline 125, shown in FIG. 11. An outline signal corresponding to the outline is generated by the computer processor. All the blocks of the outline and the blocks contained within the outline are designated as foreground. A signal corresponding to the outline is generated by the processing unit 106.

A segmented frame signal $f_n$ is created at block 56 of FIG. 5 by the processing unit 106 from the original frame signal $f_n$ and the outline signal. The segmented frame signal then is sent to an encoder or a recording medium.

Figure 12:
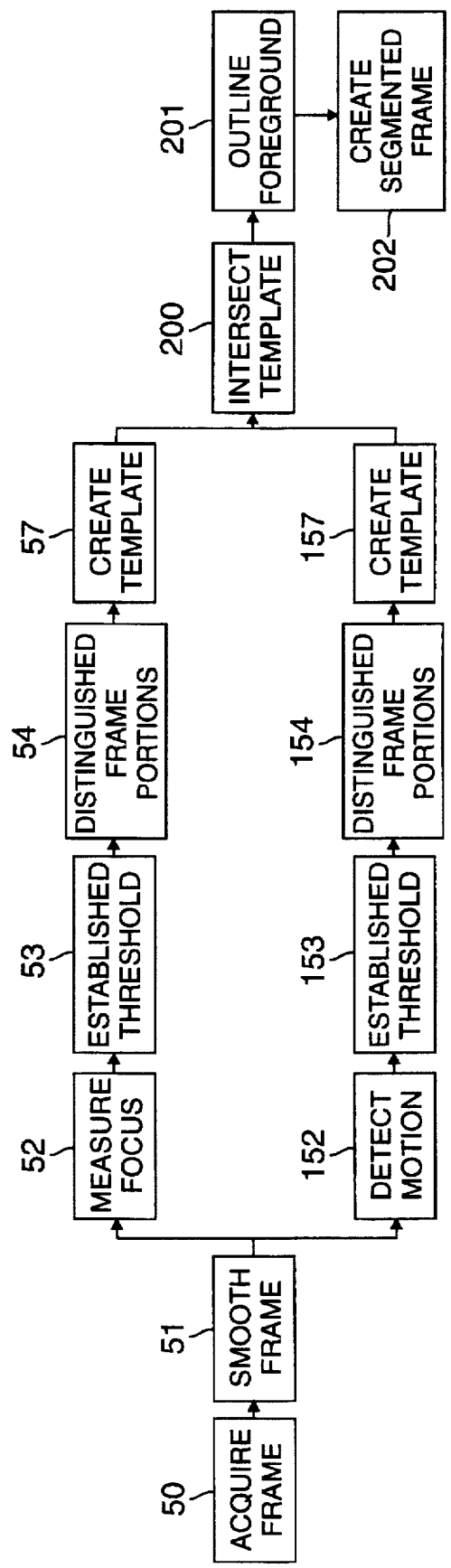
FIG. 12 is a block diagram of the steps for creating a motion/focus segmented frame.

In accord with another aspect of the invention, the focus-based segmentation discussed above may be combined with motion-based segmentation to create a motion/focus segmented frame signal. FIG. 12 is a block diagram of the steps for creating such a motion/focus segmented frame. In block 152, motion is detected in the original frame. In one acceptable method of segmentation based on motion in the video sequence, explained in B. G. Haskell, P. L. Gordon, R. L. Schmidt and J. V. Scattaglia, IEEE Trans. on Communications, Vol. Com-25, No. 11 1977, incorporated herein by reference, a motion detector 41 is used to distinguish the stationary blocks in each frame of a motion video sequence from the moving blocks in that frame. In block 153, a motion threshold is established. Analogous to the focus threshold discussed above, the motion threshold may be a predetermined constant. Alternatively, the motion threshold may be established in view of the available bandwidth such that a certain percent of the frame is designated moving (i.e., pertinent). The frame is distinguished into moving and stationary blocks in view of the motion threshold at block 154. A series of horizontal and vertical fill operations are performed at block 157 until a stable motion template is formed.

The motion-based template is intersected with the focus-based template at block 200. That is, only portions of the image that are designated pertinent in both templates are designated pertinent in the combined motion/focus template. An outline for the intersected segment is determined and an outline signal generated at block 201. The original frame signal is then combined with the outline signal to create a motion/focus segmented frame at block 202 for transmission, storage or reproduction.

The presently preferred code for pre-filtering the frames is appended hereto as Appendix I. The above description of a preferred embodiment is in no way a limitation on the scope of the invention which is defined by the following claims.

Archive/segmentOld.c

/*****************************************************************
segment.c

This routine segments the foreground and background of an image based on
image defocus.

Input:        raw image
Output:       foreground/background segmented image

Calls routines:   imageArray, sobel, laplacian, fillSegments,
                  defocus, finalOriginalImage, arrayImage
                  (All routines are in segmentation.h, pickRoutine.h)

Execution:    segment

Compilation:  cc –I –L –target sun4 –o segment segment.c –lm

Written by:   C. Swain      HO 4C–537
                            July 1994
*****************************************************************/ include "segmentation.h"
include "pickRoutine.h"

main()
{
    /*                    Initialize image parameters.
    */
    /*
    printf("What is image HEIGHT (rows): ");
    scanf("%d", &xWindowSize);
    printf("What is image WIDTH (columns): ");
    scanf("%d", &yWindowSize);

Archive/segmentOld.c

```
xwin = 0; ywin = 0;
*/ xwin = 0; ywin = 0; xWindowSize = 240; yWindowSize = 320;

/*      Load image to array.
*/
imageArray(xwin, ywin, xWindowSize, yWindowSize);

/*      Perform edge detection
*/
            /*      sobel edge detection            */
sobel(xwin, ywin, xWindowSize, yWindowSize, 1);

/*      load sobel output as laplacian input      */
for (a = 0; a < xWindowSize; ++a)
     for (b = 0; b < yWindowSize; ++b)
            originalImage[a][b] = sobelImage[a][b];

/*      laplacian edge detection        */
laplacian(xwin, ywin, xWindowSize, yWindowSize);

/*      Divide image into small windows and calculate defocus.
*/
            /*      initially partition image into small windows      */
imagePartition(xwin, ywin, xWindowSize, yWindowSize, wind);

/*
rowWindows = xWindowSize/wind;
```

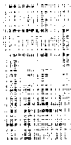

```
                                                      Archive/segmentOld.c columnWindows = yWindowSize/wind;
*/

/*          calculate defocus        */
defocus(xwin,ywin,xWindowSize,yWindowSize,rowWindows,columnWindows);

/*          Fill interior of segmented image
*/
fillSegments(xwin, ywin, xWindowSize, yWindowSize);

/*          Outline foreground segment on original image.
*/
finalOriginalImage(xwin, ywin, xWindowSize, yWindowSize);

/*          Put header on output files to display in 'xv'
*/
arrayImagePGM();

}
```

Archive/segmentationOld.h

/*********************************************************
segmentation.h

This library contains standard functions for the active vision
algorithms used in this segmentation algorithm. The functions are:

imageArray, initialSegment, focus, pop, push, popResult, pushResult,
imagePartition, generateWindows, testMatch, sobel, mergeRegions Called by: segment.c, dof.c Written by:    Sandy Swain, July 1994
*********************************************************/

/*      Include files
*/ include <math.h>
include <stdio.h>
include <stdlib.h>

/*      Define statements
*/ define OFFSET 56                       /* image data file heater offset (bytes)*/
define OFFSET1 0                       /* image data file heater offset (bytes)*/
define SEEK_SET 0                      /* beginning of file for fseek          */
define MAXDATA 100000
define abs(a) ((a < 0) ? -a : a);      /* absolute value macro                 */

/*      Global variables
*/

Archive/segmentationOld.h

```
struct node
{                                   /* definition of struct node        */
        int xCoord;                 /* upper left x coord of window     */
        int yCoord;                 /* upper left y coord of window     */
        int imageSizeX;             /* window size in x direction       */
        int imageSizeY;             /* window size in y direction       */
        int iteration;              /* window iteration                 */
        int stackNumber;            /* order of push to stack           */
        int intensity;              /* avg intensity of window          */
        double parentFQ;            /* focus quality of parent window   */
        double FQ;                  /* focus quality of this window     */
};

struct node stackResult[MAXVAL];    /* value in resulting stack         */
struct node stackItem[MAXVAL];      /* value in stack                   */
struck node image;                  /* window parameters                */ double hiFrequency;                 /* temp variable for FQ             */
double parentNodeFQ;                /* temp varialbe for parent FQ      */
double gaussianImage[1000][1000];   /* gaussian image array             */ int sp = 0;                         /* next free stackItem position     */
int spResult = 0;                   /* next free stackResult position   */
int numberWindows = 4;              /* number of smaller windows        */
int numberIteration = 0;            /* counter for number times run     */
int spread = 1;                     /* gaussian std deviation parameter */
int laplacianImage[1000][1000];     /* laplacian image array            */
int window[1000][1000];             /* gaussian filter array            */
int depthMap[1000][1000];           /* array for depth map              */
int winXCoord[100];                 /* window x-coordinate array        */
int winYCoord[100];                 /* window y-coordinate array        */
int xwin, ywin;                     /* image coordinates (x,y)          */
int xWindowSize, yWindowSize;       /* image (x,y) size                 */
int rowWindows, columnWindows;      /* image (x,y) number of windows    */
int wind = 10;                      /* window size                      */
int n,m,a,b,c,d;                    /* loop counters                    */
int variance[2000];                 /* variance of edges                */
```

Archive/segmentationOld.h

```
unsigned char imageOrig[1000][1000];           /* original image array         */
unsigned char originalImage[1000][1000];       /* image array                  */
unsigned char sobelImage[1000][1000];          /* sobel image array            */
unsigned char segmentedImage[1000][1000];      /* segmented image array        */
unsigned char intensityImage[1000][1000];      /* avg intensity image array    */
unsigned char binaryImage[1000][1000];         /* binary image array           */
unsigned char focusedImage[1000][1000];        /* recovered focused image array */
unsigned char regionImage[1000][1000];         /* region segmented image array */
unsigned char finalImage[1000][1000];          /* segmented original image array */ char filename[30];                             /* image filename */

FILE *fp, *fp1, *fp2, *fp3, *fp4, *fp5, *fp10, *fp14;   /* file pointers */

/*      Sort into descending order.     */
void swap(v, i, j)
    int *v, i, j;
{
    int temp;

temp  = *(v+i);
    *(v+i) = *(v+j);
    *(v+j) = temp;
}
```

Archive/segmentationOld.h

06/05/97
09:30:17

```
/*      Sort array in descending order          */ void qSort(v, left, right)
     int *v, left, right;
{
     int i, last;

if (left >= right) return;
     swap(v, left, (left+right)/2);
     last = left;
     for (i = left+1; i <= right; ++i)
          if (*(v+i) > *(v+left))
                swap(v, ++last, i);

swap(v, left, last);
     qSort(v, left, last-1);
     qSort(v, last+1, right);
}

/*      Partition image into small windows.      */ void imagePartition(x, y, sizeX, sizeY, winSize)
     int x, y;                          /* (x,y) upper left corner of image    */
     int sizeX, sizeY;                  /* (x,y) size of image                 */
     int winSize;                       /* window size                         */
{
     int aa,bb;

rowWindows = xWindowSize/(winSize/2);
     columnWindows = yWindowSize/(winSize/2);

for (aa = 0; aa < rowWindows; ++aa)
          winXCoord[aa] = aa*(winSize/2);

for (bb = 0; bb < columnWindows; ++bb)
          winYCoord[bb] = bb*(winSize/2);
}
```

Archive/segmentationOld.h

```
/*  Save the image to an array.  */ void imageArray(x, y, sizeX, sizeY)
    int x, y;                     /* (x,y) upper left corner of image  */
    int sizeX, sizeY;             /* (x,y) size of image               */
{
    int i, j;

printf("What is name of image file (*.raw): ");
    scanf("%s", filename);

printf("Reading image into array...\n");

/*       open the image file to read    */
    fp5 = fopen(filename, "r");

/*       skip header information        */
    fseek(fp5, OFFSET1, SEEK_SET);

/*       read image file into array originalImage    */
    for (i = x; i < x+sizeX; ++i)
    {
        for (j = y; j < y+sizeY; ++j)
        {
            fscanf(fp5, "%c", &originalImage[i][j]);
            imageOrig[i][j] = originalImage[i][j];
        }
    }
    /*       close image file    */
    fclose(fp5);
```

Archive/segmentationOld.h

```c
        /*      rewind image pointer    */
        rewind(fp5);
}

/*      Save the Motion image to an array.      */
void imageArrayMotion(x, y, sizeX, sizeY)
    int x, y;                   /* (x,y) upper left corner of image  */
    int sizeX, sizeY;           /* (x,y) size of image               */
{
    int i, j;

printf("What is name of image file (*.raw): ");
    scanf("%s", filename);

printf("Reading image into array...\n");

/*      open the image file to read     */
    fp5 = fopen(filename, "r");

/*      skip header information         */
    fseek(fp5, OFFSET1, SEEK_SET);

/*      read image file into array originalImage        */
    for (i = x; i < x+sizeX; ++i)
    {
        for (j = y; j < y+sizeY; ++j)
        {
```

Archive/segmentationOld.h

```c
                fscanf(fp5, "%c", &originalImage[i][j]);
                segmentedImage[i][j] = originalImage[i][j];
            }
        }
        /*      close image file        */
        fclose(fp5);

/*      rewind image pointer    */
        rewind(fp5);
    } void imageArrayAuto(x, y, sizeX, sizeY)
    int x, y;                   /* (x,y) upper left corner of image     */
    int sizeX, sizeY;           /* (x,y) size of image                  */
    {
        int i, j;

/*
        printf("What is name of image file (*.raw): ");
        scanf("%s", filename);

printf("%s\n", filename);
        */

/*      echo size of image      */
        printf("%d, %d, %d, %d \n", x, y, sizeX, sizeY);

/*      open the image file to read     */
        fp5 = fopen("image31.raw", "r");
```

```
                                                               Archive/segmentationOld.h /*       skip header information            */ fseek(fp5, OFFSET1, SEEK_SET);

/*       read image file into array originalImage    */ for (i = x; i < x+sizeX; ++i)
    {
        for (j = y; j < y+sizeY; ++j)
        {
            fscanf(fp5, "%c", &originalImage[i][j]);
            imageOrig[i][j] = originalImage[i][j];
        }
    }

/*       close image file        */ fclose(fp5);

/*       rewind image pointer    */ rewind(fp5);
}

/*       Automatic selection of motion result.           */ void imageArrayAutoMotion(x, y, sizeX, sizeY)
    int x, y;                       /* (x,y) upper left corner of image   */
    int sizeX, sizeY;               /* (x,y) size of image                */
{
    int i, j;
    int n = 0, m = 0;
```

Archive/segmentationOld.h

```
        printf("%d, %d, %d \n", x, y, sizeX, sizeY);

/*            read image file into array originalImage        */
        for (i = x; i < x+sizeX; ++i)
        {
                for (j = y; j < y+sizeY; ++j)
                {
                        fscanf(fp10, "%c", &originalImage[i][j]);
                        segmentedImage[n][m] = originalImage[i][j];
                        ++m;
                }
                ++n;
        }
}

/*      Calculate sobel edge detection magnitude.       */ void sobel(x, y, sizeX, sizeY, scale)
        int x, y;                                       /* (x,y) upper left corner of image     */
        int sizeX, sizeY;                               /* (x,y) size of image                  */
        int scale;                                      /* sobel filter scale size              */
{
        double sobelMagnitude;                          /* sobel magnitude                      */
        double sobelMax = 0.0;                          /* sobel maximum                        */
        double sum1;

int i, j;                                       /* loop counters                        */
        int sobelX, sobelY;                             /* sobel x- and y-direction operators   */ printf("Performing Sobel edge detection...\n");

/*      Initialize sobel image array.   */
        for (i = x; i < x+sizeX; ++i)
        {
```

Archive/segmentationOld.h

```
for (j = y; j < y+sizeY; ++j)
{
    sobelImage[i][j] = (char) 0;
}

/* Detect edges for image. */ for (i = x+scale; i < x+sizeX-scale; ++i)
{
    for (j = y+scale; j < y+sizeY-scale; ++j)
    {
        /* sobel x-direction */
        sobelX = (
             2*((int) originalImage[i+scale][j])
            +((int) originalImage[i+scale][j-scale])
            +((int) originalImage[i+scale][j+scale])
            -2*((int) originalImage[i-scale][j])
            -((int) originalImage[i-scale][j-scale])
            -((int) originalImage[i-scale][j+scale])
            )/4;

/* sobel y-direction */
        sobelY = (
             2*((int) originalImage[i][j+scale])
            +((int) originalImage[i+scale][j+scale])
            +((int) originalImage[i-scale][j+scale])
            -2*((int) originalImage[i][j-scale])
            -((int) originalImage[i-scale][j-scale])
            -((int) originalImage[i+scale][j-scale])
            )/4;

/* sobel magnitude */
        sobelMagnitude = sqrt((double) (sobelX*sobelX
                        + sobelY*sobelY));
```

Archive/segmentationOld.h

```
            sobelImage[i][j] = (char) sobelMagnitude;
        }

/*      Store result in data file.     */ fp3 = fopen("sobel.raw", "w");
        for (i = x; i < x+sizeX; ++i)
        {
            for (j = y; j < y+sizeY; ++j)
            {
                fprintf(fp3, "%c", sobelImage[i][j]);
            }
        }
        fclose(fp3);
}

/*      Thin image      */ void thin(x, y, sizeX, sizeY)
    int x, y;                         /* (x,y) upper left corner of image     */
    int sizeX, sizeY;                 /* (x,y) size of image                  */
{
    int i, j, k, l, thinMin;
    unsigned char thinnedImage[1000][1000];

printf("Thinning image...\n");

for (i = 0; i < sizeX; ++i)
        for (j = 0; j < sizeY; ++j)
            thinnedImage[i][j] = (char) 0;

for (i = 1; i < sizeX-1; ++i)
    {
```

Archive/segmentationOld.h

```
        for (j = 1; j < sizeY-1; ++j)
        {
            thinMin = 1000;

for (k = -1; k <= 1; ++k)
                for (l = -1; l <= 1; ++l)
                    if ((int) sobelImage[i+k][j+l] < thinMin)
                        thinMin = (int) sobelImage[i+k][j+l];

thinnedImage[i][j] = (char) thinMin;
        }
    } fp1 = fopen("sobel.raw", "w");
    for (i = 0; i < sizeX; ++i)
    {
        for (j = 0; j < sizeY; ++j)
        {
            fprintf(fp1, "%c", thinnedImage[i][j]);
            sobelImage[i][j] = thinnedImage[i][j];
        }
    }
    fclose(fp1);
}

/*  Calculate focus quality of image                      */ double focus(x, y, sizeX, sizeY)
    int x, y;                         /* (x,y) upper left corner of image     */
    int sizeX, sizeY;                 /* (x,y) size of image                  */
{
    double gradientCriterion=0.0;     /* power specturm result                */ long magnitude[1000][1000];       /* intermediate specturm value          */ int counter = 0;                  /* counter variable                     */
```

Archive/segmentationOld.h

```
int threshold = 10;         /* threshold for power spectrum */
int i, j;                   /* loop counter */

/*      Calculate magnitude of spectrum         */ for (i = 1; i< sizeX-1; ++i)
    for (j = 1; j < sizeY-1; ++j)
    {
        magnitude[i][j] = (int) sobelImage[i+x][j+y]
                        * (int) sobelImage[i+x][j+y];

/* if spectrum is high enough, use it in result */
        if (((int) sobelImage[i+x][j+y])>= threshold) ++counter;

/*
        printf("edge(%d,%d) = %d, magnitude = %ld\n", i, j, (int) sobelImage[i][j], magnitude[i][j]);
        */
    }

/*
printf("counter = %d\n", counter);
*/

/*      Calculate power spectrum and return result   */ gradientCriterion = 0.0;

for (i = 1; i< sizeX-1; ++i)
    for (j = 1; j < sizeY-1; ++j)
        gradientCriterion += (double) magnitude[i][j];

/*      If there are no edges in the window,
```

Archive/segmentationOld.h

```
                set focus quality = 0;
                otherwise, calculate focus quality.
   */
   if (counter < 15)
       gradientCriterion = 0.0;
   else
       gradientCriterion = gradientCriterion/(counter*1000);

return(gradientCriterion);
}

/*    calculate focus with modified Tenengrad      */ double focus2(x, y, sizeX, sizeY)
   int x, y;                              /* (x,y) upper left corner of image   */
   int sizeX, sizeY;                      /* (x,y) size of image                */
{
   double gradientCriterion=0.0;  /* power specturm result      */ long magnitude[1000][1000];    /* intermediate specturm value           */ int counter = 0;                       /* counter variable                    */
   int counterFlag = 0;                                   /* counter flag for edge width */
   int threshold = 35;                                    /* threshold for power spectrum */
   int mn, nm;                                            /* width counter                */
   int i, j;                                              /* loop counter                 */
   int width;                                             /* edge width, in pixels        */
   int xWidth[200], yWidth[200];  /* (x,y) width array, in pixels */
   int edgeWidth[500];                                    /* edge width array, combined */
   int rowAverage = 0, columnAverage = 0;                 /* (x,y) width, in pixels       */

/*       Calculate magnitude of spectrum                */ for (i = 1; i < sizeX-1; ++i)
   {
```

Archive/segmentationOld.h

```
        for (j = 1; j < sizeY-1; ++j)
        {
            magnitude[i][j] = (int) sobelImage[i+x][j+y]
                             * (int) sobelImage[i+x][j+y];

/* if spectrum is high enough, use it in result */
            if (((int) sobelImage[i+x][j+y])>= threshold) ++counter;

/*
            printf("edge(%d,%d) = %d, magnitude = %ld\n", i, j, (int) sobelImage[i][j], magnitude[i][j]);
            */
        }
    }
    /*
    printf("counter = %d\n", counter);
    */

/*      Calculate power spectrum and return result    */ gradientCriterion = 0.0;
    for (i = 1; i< sizeX-1; ++i)
        for (j = 1; j < sizeY-1; ++i)
            gradientCriterion += (double) magnitude[i][j];

/*      Initialize width arrays.        */ for (i = 0; i < 200; ++i)
    {
        xWidth[i] = 0;
        yWidth[i] = 0;
    }

/*      Calculate average edge height           */

/*      set array counter       */
```

Archive/segmentationOld.h

```
mn = -1;

/*       for each column in the window        */
for (i = 1; i < sizeX-1; ++i)
{
    /*       initialize counter flag to 0      */
    counterFlag = 0;

for (j = 1; j < sizeY-1; ++j)
    {
        /*       if there is an edge pixel, then */
        if ((int) sobelImage[i+x][j+y] >= (int) threshold)
        {
            /*
               if this pixel is adjacent to
               another edge pixel, then increment
               edge width.
            */
            if (counterFlag == 1)
            {
                ++yWidth[mn];
            }
            /*
               else, this pixel is NOT adjacent
               to another edge pixel, so reset
               width to 0 and begin counting
               new edge.
            */
            else
            {
                /*
                   if this is the first
                   time thru, set array
```

4-4

Archive/segmentationOld.h

```
                    counter. Otherwise, just
                    increment edge array.
                    */
            if (mn == -1)
                            mn = 0;
            else
                            ++mn;

/* begin counting new edge */
            ++yWidth[mn];
            counterFlag = 1;
        }
        else this is not an edge pixel    */
        {
            /* reset edge counter flag */
            counterFlag = 0;
        }
    }
}

/* Calculate average edge width.           */
/* set array counter                       */
nm = -1;
/* for each row in the window              */
for (j = 1; j < sizeY-1; ++j)
{
    /*      initialize counter flag to 0    */
```

Archive/segmentationOld.h

```
counterFlag = 0;

for (i = 1; i < sizeX-1; ++i)
{
    /*                          if there is an edge pixel, then  */
    if ((int) sobelImage[i+x][j+y] >= (int) threshold)
    {
        /*
            if this pixel is adjacent to
            another edge pixel, then increment
            edge width.
        */
        if (counterFlag == 1)
        {
            ++xWidth[nm];
        }
        /*
            else, this pixel is NOT adjacent
            to another edge pixel, so reset
            width to 0 and begin counting
            new edge.
        */
        else
        {
            /*
                if this is the first
                time thru, set array
                counter. Otherwise, just
                increment edge array.
            */
            if (nm == -1)
                nm = 0;
            else
                ++nm;
```

Archive/segmentationOld.h

```
                            /* begin counting new edge */
                            ++xWidth[nm];
                            counterFlag = 1;
                        }
                        /*  else this is not an edge pixel */
                        else
                        {
                            /* reset edge counter flag */
                            counterFlag = 0;
                        }
                    }
                }

/*  Get median of edges.  */

/*  combine yWidth and xWidth  */
        for (i = 0; i < nm; ++i) edgeWidth[i] = xWidth[i];
        for (i = nm; i < mn+nm; ++i) edgeWidth[i] = yWidth[i--nm];

/*  sort width arrays in ascending order    */
        qSort(&edgeWidth[0], 0, nm+mn);

/*
        qSort(&xWidth[0], 0, nm);
        qSort(&yWidth[0], 0, mn);
        */

/*  calculate median value  */
        width = edgeWidth[(nm+mn)/2];

/*
```

Archive/segmentationOld.h

```
    rowAverage = xWidth[nm/2];
    columnAverage = yWidth[mn/2];
    */

/*          pick larger value as edge width       (experimentally determined) */
    /*
    if (rowAverage > columnAverage)
        width = rowAverage;
    else
        width = columnAverage;
    */

/*   Sum to find criterion.  */

/*   If there are no edges in the window,
             set focus quality = 0;
         otherwise, calculate focus quality.
    */
    if (counter < 15)
        gradientCriterion = 0.0;
    else
        gradientCriterion = gradientCriterion/(counter*width);

return(gradientCriterion);
}

/*   calculate defocus     */ defocus(x, y, sizeX, sizeY, rowWin, colWin)
    int x, y;                            /* (x,y) upper left corner of image    */
    int sizeX, sizeY;                    /* (x,y) size of image                 */
    int rowWin, colWin;                  /* (x,y) number of windows in image    */
{
    double fqResult;                     /* focus quality after threshold       */
    double fqInitial;                    /* focus quality before threshold      */
```

Archive/segmentationOld.h

```
double fqThresh;
/*
double fqThresh = 1000.0;
*/                                          /* focus quality threshold   */ printf("Calculating defocus...\n");

/*
printf("What is fq threshold? ");
scanf("%lf", &fqThresh);
*/
fqThresh = 0.0;

/*
        For each small window, calculate defocus, fq
*/
for (a = 0; a < rowWin; ++a)
{
    for (b = 0; b < colWin; ++b)
    {
        /*         call defocus routine          */
        fqInitial=focus3(winXCoord[a],winYCoord[b],wind,wind);
        /*
        fqInitial=focus2(winXCoord[a],winYCoord[b],wind,wind);
        fqInitial=focus(winXCoord[a],winYCoord[b],wind,wind);
        */
        /*
        printf("*fq = %f\n", fqInitial);
        */
        /*         save defocus result in temp var, fq   */
        fqResult = fqInitial;
```

Archive/segmentationOld.h

```c
            /*   threshold defocus                    */
            if (fqResult <= fqThresh)
                fqResult = 0.0;
            else
                fqResult = 255.0;

/*   store original, fqInitial, and
                 threshold (segmented), fqResult,
                 values in all pixels w/i window
             */
            for (c = 0; c < wind/2; ++c)
            {
                for (d = 0; d < wind/2; ++d)
                {
                    segmentedImage[(winXCoord[a])+c][(winYCoord[b])+d] = (char) fqResult;
                    focusedImage[(winXCoord[a])+c][(winYCoord[b])+d] = (char) fqInitial;
                }
            }
        }
    }

/*   Write raw file to image files:
             segment.raw -- thresholded defocus (segmented) data
             sfq.raw     -- original defocus data
     */
    fp1 = fopen ("segment.raw", "w");
    fp2 = fopen ("sfq.raw", "w");

/*   open image files to write to   */

/*   write data to image file   */
```

Archive/segmentationOld.h

```
        for (a = x; a < sizeX; ++a)
        {
                for (b = y; b < sizeY; ++b)
                {
                        fprintf(fp1, "%c", segmentedImage[a][b]);
                        fprintf(fp2, "%c", focusedImage[a][b]);
                }
        }
        /*      close image files       */ fclose(fp1);
        fclose(fp2);
}

/*      Calculate intensity of selected area.   */ int avgIntensity(x, y, sizeX, sizeY)
        int x, y;                       /* (x,y) upper left corner of image     */
        int sizeX, sizeY;               /* (x,y) size of image                  */
{
        int i, j;                       /* loop counters                        */
        int counter = 0;/* temp pixel counter                                   */
        int imageIntensity = 0;         /* average intensity temp variable      */

/*      Calculate average intensity of window.  */ for (i = x; i < x+sizeX; ++i)
        {
                for (j = y; j < y+sizeY; ++j)
                {
                        imageIntensity += (int) originalImage[i][j];
                        if ((int) originalImage[i][j] > 0) ++counter;
```

Archive/segmentationOld.h

```
        }
    }
    printf("counter = %d\n", counter);
    */

/*  If the window is black, set average intensity = 0;
        otherwise, calculate average.
    */
    if (counter == 0)
        imageIntensity = 0;
    else
        imageIntensity = imageIntensity/counter;

return(imageIntensity);
}

/*      push stackItem to stack                         */
void push(image)
struct node image;
{
    if (sp < MAXVAL)
        stackItem[sp++] = image;
    else
        printf("error: stack full, can't push\n");
}

/*      pop stackItem from stack                        */
struct node pop()
{
    if (sp > 0)
        return (stackItem[--sp]);
```

Archive/segmentationOld.h

```
    else
    {
        printf("error: stack empty.\n");
        return;
    }
}

/*      push stackResult to stack                       */ void pushResult(image)
struct node image;
{
/*
    printf("Push to result stack...\n");
*/
    if (spResult < MAXVAL)
        stackResult[spResult++] = image;
    else
        printf("error: stack full, can't push\n");
}

/*      pop stackResult from stack                      */ struct node popResult()
{
/*
    printf("Pop from result stack...\n");
*/
    if (spResult > 0)
        return (stackResult[--spResult]);
    else
    {
        printf("error: stack empty.\n");
        return;
    }
}
```

```
/*                    Archive/segmentationOld.h generate windows                */ void generateWindows(x, y, sizeX, sizeY, FQparent, iterationNumber)
     int x, y;                    /* (x,y) upper left corner of image     */
     int sizeX, sizeY;            /* (x,y) size of image                  */
     int iterationNumber;         /* recursive loop counter               */
     double FQparent;             /* focus quality of parent node         */
{
     int i, j, k;                 /* loop counter                         */

/*        Increment number of recusion.      */

++iterationNumber;

/*        Store in structure windows to be processed:
                    (x,y) upper left corners of window
                    (x,y) window size (in pixels)
                    level of recursion
                    it and parent's focus qualitys
     */

/*
     printf("Generating windows, recursion = %d\n", iterationNumber);
     */ for (i = 0; i < numberWindows/2; ++i)
     {
          for (j = 0; j < numberWindows/2; ++j)
          {
               image.xCoord = x + i*(sizeX/2);
               image.yCoord = y + j*(sizeY/2);
               image.imageSizeX = sizeX/(numberWindows/2);
               image.imageSizeY = sizeY/(numberWindows/2);
               image.iteration = iterationNumber;
               image.parentFQ = FQparent;
               image.FQ = focus(image.xCoord, image.yCoord, image.xCoord, image.yCoord, image.imageSizeX, image.imageSizeY);
               image.intensity = avgIntensity(image.xCoord, image.yCoord, image.xCoord, image.imageSizeX, image.imag
eSizeY);
```

Archive/segmentationOld.h

```
                    push(image);          /*   Push window stucture to stack      */
        }
    }
    /*  Test if window should be split even more    */
} void testMatch()
{
    double error;
    double thresh = 0.0;              /* diff between parent-child FQ             */
                                      /* threshold for error diff          */
    struct node win;                  /* temp variable for struct     */
    /*         pop node off stack         */
    win = pop();
    /*
    printf("%c %d %lf\n", (char) win.FQ, (int) win.FQ, win.FQ);
    */
    /*     Test for no smaller windows:
               if parent and child FQ are almos same;
               or if more than three recusions
    */
    error = abs(win.FQ - win.parentFQ);
    /*         if YES, don't divide into smaller windows.
               push to result stack.
    */
    if ( ( (error <= thresh) || (win.iteration > 5) ) )
    {
```

Archive/segmentationOld.h

```
        pushResult(win);

/*
                if ALL smaller windows processed, quit.
                else pop next from stack and recursively process.
        */
        if (sp == 0)
        {
                return;
        }
        else
        {
                testMatch();
        }
    }
    /*
        if NO, divide into smaller windows. calculate focus
        quality for the newly created smaller windows.
        recursively, test them.
    */
    else
    {
        generateWindows(win.xCoord, win.yCoord, win.imageSizeX, win.imageSizeY, win.FQ, win.iteration);
        testMatch();
    }
}

/*      Draw and binarize segmented image.      */ void initialSegment()
{
        struct node win;            /* temp struct file     */
        int i, j;                   /* loop counter         */ for (i = 0; i < xWindowSize; ++i)
```

Archive/segmentationOld.h

```
        for (j = 0; j < yWindowSize; ++j)
            segmentedImage[i][j] = (char) 0;

/*      read resulting segmented image from result stack        */ while (spResult > 0)
{
    win = popResult();

/*      For every element in the stack, draw the window
            as the focus quality of that window.
            Print to raw image file.
    */ for (i = 0; i < win.imageSizeX; ++i)
    {
        for (j = 0; j < win.imageSizeY; ++j)
        {
            segmentedImage[i+win.xCoord][j+win.yCoord]=(char) (win.FQ*5);
            intensityImage[i+win.xCoord][j+win.yCoord]=(char) (win.intensity);
/*
            printf("%c %d %d\n", (char) win.FQ, (int) win.FQ, win.FQ);
*/
        }
    }
}

/*      open raw file to write image into       */ fp1 = fopen ("segment.raw", "w");
fp2 = fopen ("sintensity.raw", "w");

for (i = 0; i < xWindowSize; ++i)
{
    for (j = 0; j < yWindowSize; ++j)
    {
        fprintf(fp1, "%c", segmentedImage[i][j]);
        fprintf(fp2, "%c", intensityImage[i][j]);
```

Archive/segmentationOld.h

```
        }
        fclose(fp1);
        fclose(fp2);
}

/*      Merge segments based on intensity and defocus.         */ void mergeRegions(x, y, sizeX, sizeY)
        int x, y;                               /* (x,y) upper left corner of image       */
        int sizeX, sizeY;                       /* (x,y) size of image                    */
{
        int i, j;                               /* loop counter                           */
        int segmentCounter = 0, intensityCounter = 0, binaryCounter = 0;
                                                /* temp variable counters                 */
        int segmentThreshold = 1, intensityThreshold = 20;
                                                /* temp variable thresholds               */
        int n, m;                               /* wind counters                          */
        int error;

printf("Calculate binary image...\n");
        for (i = x; i < x+sizeX; ++i)
                for (j = y; j < y+sizeY; ++j)
                        binaryImage[i][j] = (char) 0;

/*      initially partition image into small winds     */ n = xWindowSize/wind;
        m = yWindowSize/wind;

for (a = 0; a < n; ++a)
        {
                for (i = 0; i < wind; ++i)
                        for (j = 0; j < wind; ++j)
                                binaryImage[a*wind+i][j] = segmentedImage[a*wind+i][j];
```

Archive/segmentationOld.h

```
for (b = 0; b < m; ++b)
{
    for (i = 0; i < wind; ++i)
        for (j = 0; j < wind; ++j)
            binaryImage[i][b*wind+j] = segmentedImage[i][b*wind+j];
}

/* for each wind, calculate fq and avg intensity */ for (a = 0; a < n-1; ++a)
    for (b = 0; b < m-1; ++b)
    {
        if ((int) binaryImage[a*wind][(b-1)*wind] == 255) binaryCounter = 1;
        if ((int) segmentedImage[a*wind][b*wind] == 255) ++segmentCounter;
        if ((int) segmentedImage[(a-1)*wind][b*wind] == 255) ++segmentCounter;
        if ((int) segmentedImage[(a+1)*wind][b*wind] == 255) ++segmentCounter;
        if ((int) segmentedImage[a*wind][(b-1)*wind] == 255) ++segmentCounter;
        if ((int) segmentedImage[a*wind][(b+1)*wind] == 255) ++segmentCounter;

error = abs(((int) intensityImage[a*wind][b*wind]) - ((int) intensityImage[(a-1)*wind][b*wind]));
        if (error < intensityThreshold) ++intensityCounter;

error = abs(((int) intensityImage[a*wind][b*wind]) - ((int) intensityImage[(a+1)*wind][b*wind]));
        if (error < intensityThreshold) ++intensityCounter;

error = abs(((int) intensityImage[a*wind][b*wind]) - ((int) intensityImage[(b-1)*wind]));
        if (error < intensityThreshold) ++intensityCounter;

error = abs(((int) intensityImage[a*wind][b*wind]) - ((int) intensityImage[a*wind][(b+1)*wind]));
        if (error < intensityThreshold) ++intensityCounter;

if ((((binaryCounter == 1) || (segmentCounter >= 2)) && (intensityCounter >= 2))
        {
            for (i = 0; i < wind; ++i)
                for (j = 0; j < wind; ++j)
                    binaryImage[a*wind+i][b*wind+j] = (char) 255;
        }
    }
```

Archive/segmentationOld.h

```
            else
            {
                for (i = 0; i < wind; ++i)
                    for (j = 0; j < wind; ++j)
                        binaryImage[a*wind+i][b*wind+j] = (char) 0;
            }
            segmentCounter = 0; intensityCounter = 0; binaryCounter = 0;
        }

/*  open raw file to write image into   */ fp1 = fopen ("sbinary.raw" , "w");
    for (i = x; i < x+sizeX; ++i)
    {
        for (j = y; j < y+sizeY; ++j)
        {
            fprintf(fp1, "%c", binaryImage[i][j]);
        }
    }
    fclose(fp1);
} void regionGrowing(x, y, sizeX, sizeY)
    int x, y;                   /* (x,y) upper left corner of image    */
    int sizeX, sizeY;           /* (x,y) size of image                 */
{
    int i, j;                   /* loop counter                        */ printf("Growing regions...\n");
    for (i = x; i < x+sizeX; ++i)
    {
        for (j = y; j < y+sizeY; ++j)
        {
            if (((int) originalImage[i][j] >= 0) &&
```

Archive/segmentationOld.h

```
((int) originalImage[i][j] < 40))
    regionImage[i][j] = (char) 20;
if (((int) originalImage[i][j] >= 40) &&
    ((int) originalImage[i][j] < 80))
    regionImage[i][j] = (char) 60;
if (((int) originalImage[i][j] >= 80) &&
    ((int) originalImage[i][j] < 120))
    regionImage[i][j] = (char) 100;
if (((int) originalImage[i][j] >= 120) &&
    ((int) originalImage[i][j] < 160))
    regionImage[i][j] = (char) 140;
if (((int) originalImage[i][j] >= 160) &&
    ((int) originalImage[i][j] < 200))
    regionImage[i][j] = (char) 180;
if (((int) originalImage[i][j] >= 200) &&
    ((int) originalImage[i][j] < 240))
    regionImage[i][j] = (char) 220;
if (((int) originalImage[i][j] >= 240) &&
    ((int) originalImage[i][j] < 256))
    regionImage[i][j] = (char) 250;
/*
if (((int) originalImage[i][j] >= 0) &&
    ((int) originalImage[i][j] < 40))
    regionImage[i][j] = (char) 10;
if (((int) originalImage[i][j] >= 20) &&
    ((int) originalImage[i][j] < 40))
    regionImage[i][j] = (char) 30;
if (((int) originalImage[i][j] >= 40) &&
    ((int) originalImage[i][j] < 60))
    regionImage[i][j] = (char) 50;
```

Archive/segmentationOld.h

```
if ((((int) originalImage[i][j] >= 60) &&
    ((int) originalImage[i][j] < 80))
        regionImage[i][j] = (char) 70;

if ((((int) originalImage[i][j] >= 80) &&
    ((int) originalImage[i][j] < 100))
        regionImage[i][j] = (char) 90;

if ((((int) originalImage[i][j] >= 100) &&
    ((int) originalImage[i][j] < 120))
        regionImage[i][j] = (char) 110;

if ((((int) originalImage[i][j] >= 120) &&
    ((int) originalImage[i][j] < 140))
        regionImage[i][j] = (char) 130;

if ((((int) originalImage[i][j] >= 140) &&
    ((int) originalImage[i][j] < 160))
        regionImage[i][j] = (char) 150;

if ((((int) originalImage[i][j] >= 160) &&
    ((int) originalImage[i][j] < 180))
        regionImage[i][j] = (char) 170;

if ((((int) originalImage[i][j] >= 180) &&
    ((int) originalImage[i][j] < 200))
        regionImage[i][j] = (char) 190;

if ((((int) originalImage[i][j] >= 200) &&
    ((int) originalImage[i][j] < 220))
        regionImage[i][j] = (char) 210;

if ((((int) originalImage[i][j] >= 220) &&
    ((int) originalImage[i][j] < 240))
        regionImage[i][j] = (char) 230;

if ((((int) originalImage[i][j] >= 240) &&
    ((int) originalImage[i][j] < 256))
        regionImage[i][j] = (char) 250;
*/
```

Archive/segmentationOld.h

```c
        }
/*      open raw file to write image into      */
fp1 = fopen("sregion.raw", "w");
for (i = x; i < x+sizeX; ++i)
{
        for (j = y; j < y+sizeY; ++j)
        {
                fprintf(fp1, "%c", regionImage[i][j]);
        }
}
fclose(fp1);
}

/*      recover focus for blurred objects (Subbarao's algorithm)        */
void focusRecovery(x, y, sizeX, sizeY)
        int x, y;                       /* (x,y) upper left corner of image      */
        int sizeX, sizeY;               /* (x,y) size of image                   */
{
        int i, j;                       /* loop counter */
        double result;

FILE *fp6;

printf("Recovering focus...\n");
        fp6 = fopen("sfocus.raw", "w");
        for (i = x; i < x+sizeX; ++i)
        {
                for (j = y; j < y+sizeY; ++j)
                {
                        result = (double) originalImage[i][j]
                                - (3.0*3.0*((double) sobelImage[i][j])/4.0);
```

Archive/segmentationOld.h

```
        if (result < 0.0) result = 0.0;
        focusedImage[i][j] = (char) result;
        fprintf(fp6, "%c", focusedImage[i][j]);
      }
    fclose(fp6);
}

/* fill interior of segmented image with convex shape    */ void fillSegments(x, y, sizeX, sizeY)
    int x, y;                                    /* (x,y) upper left corner of image    */
    int sizeX, sizeY;                            /* (x,y) size of image                 */
{
    int i, j;                                    /* loop counter                        */
    int fill;
    int firstRun;
    int horizontalMin[1000], horizontalMax[1000];

FILE *fp6, *fp12, *fp13;

printf("Filling segments...\n");

for (i = x; i < x+sizeX; ++i)
    {
        horizontalMin[i] = 0;
        horizontalMax[i] = 0;
    } for (i = x; i < x+sizeX; ++i)
        for (j = y; j < y+sizeY; ++i)
            binaryImage[i][j] = (char) 0;

/*           first pass         */ for (i = x+10; i < x+sizeX; ++i)
    {
```

Archive/segmentationOld.h

```
firstRun = 0;

for (j = y+10; j < y+sizeY-10; ++j)
{
    if ((int) segmentedImage[i][j] == 255)
    {
        if (firstRun == 0) horizontalMin[i] = j;
        horizontalMax[i] = j;
        ++firstRun;
    }
} for (i = x; i < x+sizeX; ++i)
    for (j = horizontalMin[i]; j < horizontalMax[i]; ++j)
        binaryImage[i][j] = (char) 255;

fp12 = fopen("sbinaryHorizontal.raw", "w");

for (i = x; i < x+sizeX; ++i)
    for (j = y; j < y+sizeY; ++j)
        fprintf(fp12, "%c", binaryImage[i][j]);

fclose(fp12);

/*      first pass      */ for (i = x+10; i < x+sizeX-10; ++i)
{
    for (j = y+10; j < y+sizeY-10; ++j)
    {
        if(((int) binaryImage[i][j] == 0) &&
           (((int) binaryImage[i-10][j] == 255) &&
            ((int) binaryImage[i+10][j] == 255)))
                binaryImage[i][j] = (char) 255;
    }
}
```

Archive/segmentationOld.h

```
for (i = x+20; i < x+sizeX-20; ++i)
{
    for (j = y+20; j < y+sizeY-20; ++j)
    {
        if(((int) binaryImage[i][j] == 0) &&
           ((int) binaryImage[i-20][j] == 255) &&
           ((int) binaryImage[i+20][j] == 255))
            binaryImage[i][j] = (char) 255;
    }
} fp13 = fopen("sbinaryVertical.raw", "w");
for (i = x; i < x+sizeX; ++i)
    for (j = y; j < y+sizeY; ++j)
        fprintf(fp13, "%c", binaryImage[i][j]);
fclose(fp13);

/*      second pass     */ for (i = x+10; i < x+sizeX; ++i)
{
    firstRun = 0;
    for (j = y+10; j < y+sizeY-10; ++j)
    {
        if ((int) binaryImage[i][j] == 255)
        {
            if (firstRun == 0) horizontalMin[i] = j;
            horizontalMax[i] = j;
            ++firstRun;
        }
    }
} for (i = x; i < x+sizeX; ++i)
    for (j = horizontalMin[i]; j < horizontalMax[i]; ++j)
        binaryImage[i][j] = (char) 255;
```

Archive/segmentationOld.h

```
/*      second pass     */ for (i = x+10; i < x+sizeX-10; ++i)
{
    for (j = y+10; j < y+sizeY-10; ++j)
    {
        if(((int) binaryImage[i][j] == 0) &&
           ((int) binaryImage[i-10][j] == 255) &&
           ((int) binaryImage[i+10][j] == 255))
                binaryImage[i][j] = (char) 255;
    }
} for (i = x+20; i < x+sizeX-20; ++i)
{
    for (j = y+20; j < y+sizeY-20; ++j)
    {
        if(((int) binaryImage[i][j] == 0) &&
           ((int) binaryImage[i-20][j] == 255) &&
           ((int) binaryImage[i+20][j] == 255))
                binaryImage[i][j] = (char) 255;
    }
}

/*      third pass      */ for (i = x+10; i < x+sizeX; ++i)
{
    firstRun = 0;

for (j = y+10; j < y+sizeY-10; ++j)
    {
        if ((int) binaryImage[i][j] == 255)
        {
            if (firstRun == 0) horizontalMin[i] = j;
            horizontalMax[i] = j;
```

Archive/segmentationOld.h

```
        ++firstRun;
    }
} for (i = x; i < x+sizeX; ++i)
    for (j = horizontalMin[i]; j < horizontalMax[i]; ++j)
        binaryImage[i][j] = (char) 255;

/*    third pass    */ for (i = x+10; i < x+sizeX-10; ++i)
{
    for (j = y+10; j < y+sizeY-10; ++j)
    {
        if(((int) binaryImage[i][j] == 0) &&
           ((int) binaryImage[i-10][j] == 255) &&
           ((int) binaryImage[i+10][j] == 255))
            binaryImage[i][j] = (char) 255;
    }
} for (i = x+20; i < x+sizeX-20; ++i)
{
    for (j = y+20; j < y+sizeY-20; ++j)
    {
        if(((int) binaryImage[i][j] == 0) &&
           ((int) binaryImage[i-20][j] == 255) &&
           ((int) binaryImage[i+20][j] == 255))
            binaryImage[i][j] = (char) 255;
    }
} fp6 = fopen("sbinary.raw", "w");

for (i = x; i < x+sizeX; ++i)
```

Archive/segmentationOld.h

```c
        for (j = y; j < y+sizeY; ++j)
            fprintf(fp6, "%c", binaryImage[i][j]);

fclose(fp6);
}

/*    dilate image    */ void dilate(x, y, sizeX, sizeY)
int x, y;                      /* (x,y) upper left corner of image    */
int sizeX, sizeY;              /* (x,y) size of image                 */
{
    int i,j;
    unsigned char dilatedImage[1000][1000];
    FILE *fp6;

for(i = x; i < sizeX; ++i)
        for(j = y; j < sizeY; ++i)
            dilatedImage[i][j]= (char) 0;

for(i = 1; i < sizeX-1; ++i)
        for(j = 1; j < sizeY-1; ++j)
            if ( ((int) sobelImage[i-1][j-1]!= 0) ||
                 ((int) sobelImage[i-1][j]!= 0) ||
                 ((int) sobelImage[i-1][j+1]!= 0) ||
                 ((int) sobelImage[i][j-1]!= 0) ||
                 ((int) sobelImage[i][j]!= 0) ||
                 ((int) sobelImage[i][j+1]!= 0) ||
                 ((int) sobelImage[i+1][j-1]!= 0) ||
                 ((int) sobelImage[i+1][j]!= 0) ||
                 ((int) sobelImage[i+1][j+1]!= 0) )
                dilatedImage[i][j]= (char) 255;

for(i = x; i < sizeX; ++i)
        for(j = y; j < sizeY; ++j)
            sobelImage[i][j] = dilatedImage[i][j];
```

Archive/segmentationOld.h

```
fp6 = fopen("sobel.raw", "w");

for (i = x; i < x+sizeX; ++i)
    for (j = y; j < y+sizeY; ++j)
        fprintf(fp6, "%c", sobelImage[i][j]);

fclose(fp6);
}

/* draw boundary around segmented foreground    */ void finalOriginalImage(x, y, sizeX, sizeY)
int x, y;                  /* (x,y) upper left corner of image   */
int sizeX, sizeY;          /* (x,y) size of image                */
{
int i, j;
FILE *fp7, *fp8;

printf("Drawing boundary....\n");

for (i = x; i < x+sizeX; ++i)
    for (j = y; j < y+sizeY; ++j)
        originalImage[i][j] = binaryImage[i][j];

sobel(x, y, sizeX, sizeY, 1);
dilate(x, y, sizeX, sizeY);

for (i = x; i < x+sizeX; ++i)
    for (j = y; j < y+sizeY; ++j)
        finalImage[i][j] = imageOrig[i][j] | sobelImage[i][j];

fp7 = fopen("sfinal.raw", "w");

/*
```

Archive/segmentationOld.h

```c
    fp8 = fopen("image3Final.r", "a");
    */
    for (i = x; i < x+sizeX; ++i)
    {
        for (j = y; j < y+sizeY; ++j)
        {
            fprintf(fp7, "%c", finalImage[i][j]);
            /*
            fprintf(fp8, "%c", finalImage[i][j]);
            */
        }
    }
    fclose(fp7);
    /*
    fclose(fp8);
    */
} void finalBinaryImage(x, y, sizeX, sizeY)
    int x, y;                           /* (x,y) upper left corner of image */
    int sizeX, sizeY;                   /* (x,y) size of image              */
{
    int i, j;
    FILE *fp7;

for (i = x; i < x+sizeX; ++i)
        for (j = y; j < y+sizeY; ++j)
            originalImage[i][j] = binaryImage[i][j];

sobel(x, y, sizeX, sizeY, 1);

fp7 = fopen("image3.s", "a");
    for (i = x; i < x+sizeX; ++i)
        for (j = y; j < y+sizeY; ++j)
            fprintf(fp7, "%c", sobelImage[i][j]);
```

Archive/segmentationOld.h

```
    fclose(fp7);
}

/*  Write array to image and convert to xv format for display.   */
/*  Image is 240 x 320.                                          */ void arrayImage()
{
    printf("Creating xv readable file...\n");

/*   remove any existing resulting image files.    */
    system("rm s*1.raw");

/*   create sobel and segmentation image files.   */
    system("cat header.raw sobel.raw > sobel1.raw");
    system("cat header.raw segment.raw > segment1.raw");
    system("cat header.raw sbinaryHorizontal.raw > sbinaryHorizontal1.raw");
    system("cat header.raw sbinaryVertical.raw > sbinaryVertical1.raw");
    system("cat header.raw sbinary.raw > sbinary1.raw");
    system("cat header.raw sfinal.raw > sfinal1.raw");
    system("cat header.raw sfq.raw > sfq1.raw");
    /*
    system("cat header.raw sfocus.raw > sfocus1.raw");
    system("cat header.raw sregion.raw > sregion1.raw");
    */
}

/*  Write array to image and convert to xv format for display.   */
/*  Use rawtopgm. Image is 240 x 320.                            */ void arrayImagePGM()
{
```

Archive/segmentationOld.h

```
printf("Creating xv readable PGM file...\n");

/*     remove any existing resulting image files.     */
system("rm s*1.raw");

/*     create sobel and segmentation image files.     */
system("rawtopgm 320 240 sobel.raw > sobel1.raw");
/*
system("rawtopgm 320 240 segment.raw > segment1.raw");
system("rawtopgm 320 240 sbinaryHorizontal.raw > sbinaryHorizontal1.raw");
system("rawtopgm 320 240 sbinaryVertical.raw > sbinaryVertical1.raw");
*/
system("rawtopgm 320 240 sbinary.raw > sbinary1.raw");
system("rawtopgm 320 240 sfinal.raw > sfinal1.raw");
system("rawtopgm 320 240 sfq.raw > sfq1.raw");
/*
system("rawtopgm 320 240 sfocus.raw > sfocus1.raw");
system("rawtopgm 320 240 sregion.raw > sregion1.raw");
*/
}

/*     Write array to image and convert to xv format for display.     */
/*     Use rawtopgm. Image is 240 x 320.                               */ void arrayImageMotion()
{
printf("Creating xv readable file...\n");

/*     remove any existing resulting image files.     */
system("rm s*1.raw");

/*     create sobel and segmentation image files.     */
```

```
                                                        Archive/segmentationOld.h
        system("rawtopgm 320 240 sbinary.raw > sbinary1.raw");
}

/*************REDUCED SAMPLING ROUTINES***************/

/*      Convert reduced array to reduced image file for display.    */ void arrayImage2()
{
        /*      remove any existing resulting image files.    */
        system("rm s*1.raw");

/*      create sobel and segmentation image files.    */
        system("cat header.raw sobel.raw > sobel1.raw");
        system("cat header.raw segment.raw > segment1.raw");
        system("cat header.raw sintensity.raw > sintensity1.raw");
        system("cat header.raw sfocus.raw > sfocus1.raw");
        system("cat header.raw sbinary.raw > sbinary1.raw");
        /*
        system("cat header.raw sregion.raw > sregion1.raw");
        */
}

/*******************OTHER ROUTINES********************/

/*      Calculate gaussian filter     */ void gaussian(x, y, sizeX, sizeY, sigma)
        int x, y;                       /* (x,y) upper left corner of image    */
        int sizeX, sizeY;               /* (x,y) size of image                 */
        int sigma;                      /* gaussian spread parameter           */
{
```

Archive/segmentationOld.h

```
double gaussianConstant = 0.0;      /* constant in gaussian filter  */
double weight[10][10];              /* gaussian filter              */ int i, j, k, l;                     /* loop counters                */
int sum = 0;                        /* temp variable                */

/*      Calculate weight matrix.   */ for (i = -sigma; i <= sigma; ++i)
{
    for (j = -sigma; j <= sigma; ++j)
    {
        gaussianConstant = gaussianConstant
                          + exp((-1./2.)*(i*i+j*j)/(sigma*sigma));
        printf("gaussianConstant = %lf\n", gaussianConstant);
    }
} gaussianConstant = 1./gaussianConstant ;

for (i = -sigma; i <= sigma; ++i)
{
    for (j = -sigma; j <= sigma; ++j)
    {
        weight[i+sigma][j+sigma] = gaussianConstant
                          * exp((-1./2.)*(i*i+j*j)/(sigma*sigma));
        printf("weight(%d,%d) = %lf\n", i+sigma, j+sigma,
                          weight[i+sigma][j+sigma]);
    }
} for (i = x+sigma; i < sizeX-sigma; ++i)
{
    for (j = y+sigma; j < sizeY-sigma; ++j)
    {
        for (k = -sigma; k <= sigma; ++k)
        {
            for (l = -sigma; l <= sigma; ++l)
```

Archive/segmentationOld.h

```c
                sum = sum + weight[k+sigma][l+sigma]
                        * (int) originalImage[i+k][j+l];
                /*
                printf("sum = %d, originalImage(%d,%d) = %d\n", sum, i+k,j+l, (int) originalImage[i+k][j+l]);
                */
            }
        }
        /*
        printf("gaussianImage(%d, %d) = %d\n", i, j, sum);
        */
        gaussianImage[i][j] = (char) sum;
        sum = 0;
        }
    }
}

/* Calculate power spectrum for image (focus quality) */ double powerSpectrum(x, y, sizeX, sizeY)
    int x, y;                        /* (x,y) upper left corner of image    */
    int sizeX, sizeY;                /* (x,y) size of image                 */
{
    double gradientCriterion=0.0;    /* power specturm result    */ long magnitude[1000][1000];      /* intermediate specturm value    */ int counter = 0;                 /* counter variable    */
    int threshold = 50;              /* threshold for power spectrum    */
    int i, j;                        /* loop counter    */ printf("Calculate power spectrum...\n");
```

Archive/segmentationOld.h

/*          Calculate sobel edge detection          */ sobel(x, y, sizeX, sizeY);

/*          Calculate magnitude of spectrum          */ for (i = 1; i< sizeX−1; ++i)
{
    for (j = 1; j < sizeY−1; ++j)
    {
        magnitude[i][j] = (int) sobelImage[x+i][y+j]
                        * (int) sobelImage[x+i][y+j];

/* if spectrum is high enough, use it in result */
        if ((int) sobelImage[x+i][y+j] >= threshold) ++counter;

/*
        printf("edge(%d,%d) = %d, magnitude = %ld\n", i, j, (int) sobelImage[x+i][y+j], magnitude[i][j]);
        */
    }
} printf("counter = %d\n", counter);

/* Calculate power spectrum and return result          */
gradientCriterion = 0.0;

for (i = 1; i< sizeX−1; ++i)
    for (j = 1; j < sizeY−1; ++j)
        gradientCriterion += (double) magnitude[i][j];

gradientCriterion = gradientCriterion/(counter*1000);

return(gradientCriterion);
}

Archive/segmentationOld.h

```c
/*      Calculate spatial frequency     */ double spatialFrequency(x, y, sizeX, sizeY)
    int x, y;                           /* (x,y) upper left corner of image  */
    int sizeX, sizeY;                   /* (x,y) size of image               */
{
    double gradientCriterion=0.0;       /* power specturm result             */ int counter = 0;                    /* counter variable                  */
    int threshold = 50;                 /* threshold for power spectrum      */
    int i, j;                           /* loop counter                      */

/*      Perform Sobel edge detection.   */
    sobel(x, y, sizeX, sizeY, 1);

/*      Calculate square of magnitude.  */
    for (i = x; i< x+sizeX; ++i)
        for (j = y; j < y+sizeY; ++j)
            if ((int) sobelImage[i][j] >= threshold) ++counter;

printf("counter = %d\n", counter);

/*      Sum to find criterion.          */
    gradientCriterion = (double) counter/ (double) (sizeX*sizeY);

return(gradientCriterion);
}

/*      Calculate histogram.    */
```

Archive/segmentationOld.h

```c
void histogram(x, y, sizeX, sizeY, histogramValue)
int x, y, sizeX, sizeY, *histogramValue;
{
    FILE *fp1;
    int i, j, intensity;
    unsigned char originalImage[512][512];

fp1 = fopen("histogram.dat", "w");

for (i = 0; i < sizeX; ++i)
    {
        for (j = 0; j < sizeY; ++j)
        {
            intensity = (int) originalImage[i][j];
            ++ *(histogramValue+intensity);
            fprintf(fp1, "%d ", intensity);
        }
        fprintf(fp1, "\n");
    } fclose(fp1);
/*
    for (i = 0; i < 256; ++i)
    {
        printf("histogram(%d) = %d\n", i, *histogramValue);
        ++histogramValue;
    }
*/
}

/*    Calculate probability.    */ void probability(x, y, sizeX, sizeY, histogramValue, P)
int x, y, sizeX, sizeY, *histogramValue;
double *P;
```

Archive/segmentationOld.h

```
{
    int i, sum = 0, *temp;

temp = histogramValue;

for (i = 0; i < 256; ++i)
    {
        sum += *temp;
        ++temp;
    } for (i = 0; i < 256; ++i)
    {
        *P = (double) *histogramValue/sum;
        ++histogramValue;
        ++P;
    }
}

/*      Calculate minimum within group variance threshold.      */ double threshold(x, y, sizeX, sizeY)
    int x, y, sizeX, sizeY;
{
    int i, j, histogramValue[256];
    double q1[256], q2[256], u1[256], u2[256], v1[256], v2[256], vw[256], P[256];
    double minVariance = 1000000.0;
    double thresh;

for (i = 0; i < 256; ++i)
    {
        histogramValue[i] = 0;
        P[i] = 0.0;
    } histogram(x, y, sizeX, sizeY, &histogramValue[0]);
```

Archive/segmentationOld.h

```
probability(x, y, sizeX, sizeY, &histogramValue[0], &P[0]);

for (i = 0; i < 255; ++i)
{
    q1[i] = 0.; q2[i] = 0.; u1[i] = 0.; u2[i] = 0.;
    v1[i] = 0.; v2[i] = 0.; vw[i] = 0.;

for (j = 0; j <= i; ++j)
        q1[j] += P[j];

for (j = i+1; j < 256; ++j)
        q2[j] += P[j];

for (j = 0; j <= i; ++j)
        u1[i] += j*(P[j])/q1[i];

for (j = i+1; j < 256; ++j)
        u2[i] += j*(P[j])/q2[i];

for (j = 0; j <= i; ++j)
        v1[i] += (j – u1[i])*(j – u1[i])*(P[j])/q1[i];

for (j = i+1; j < 256; ++j)
        v2[i] += (j – u2[i])*(j – u2[i])*(P[j])/q2[i];

vw[i] = q1[i]*v1[i] + q2[i]*v2[i];
} for (i = 0; i < 255; ++i)
    if (vw[i] < minVariance)
    {
        minVariance = vw[i];
        thresh = (double) i;
    } return(thresh);
}
```

Archive/segmentationOld.h

/* Normalize images for brightness resulting from various apertures. */

```
void normalization(x, y, sizeX, sizeY, sigma)
    int x, y;                    /* (x,y) upper left corner of image  */
    int sizeX, sizeY;            /* (x,y) size of image               */
    int sigma;                   /* gaussian spread parameter         */
{
    double gaussianConstant = 0.0;    /* constant in gaussian filter  */
    double weight[10][10];            /* gaussian filter              */ int i, j, k, l;                   /* loop counters                */
    int sum = 0;                      /* temp variable                */

/*          Calculate weight matrix.
    */ printf("Calculate Gaussian...\n");

/* Calculate gaussian constant for weight matrix */ for (i = -sigma; i <= sigma; ++i)
    {
        for (j = -sigma; j <= sigma; ++j)
        {
            gaussianConstant = gaussianConstant
                + exp((-1./2.)*((i*i+j*j)/(sigma*sigma));
            /*
            printf("gaussianConstant = %lf\n", gaussianConstant);
            */
        }
    } gaussianConstant = 1./gaussianConstant ;

/* Calculate weight matrix (gaussian filter) */
```

Archive/segmentationOld.h

```
for (i = -sigma; i <= sigma; ++i)
{
    for (j = -sigma; j <= sigma; ++j)
    {
        weight[i+sigma][j+sigma] = gaussianConstant
            * exp((-1./2.)*(i*i+j*j)/(sigma*sigma));
        /*
        printf("weight(%d,%d) = %lf\n", i+sigma, j+sigma,
               weight[i+sigma][j+sigma]);
        */
    }
}

/* Apply gaussian filter to small windows in original image */ for (i = sigma; i < sizeX-sigma; ++i)
{
    for (j = sigma; j < sizeY-sigma; ++j)
    {
        for (k = -sigma; k <= sigma; ++k)
        {
            for (l = -sigma; l <= sigma; ++l)
            {
                sum = sum + weight[k+sigma][l+sigma]
                    * (int) originalImage[i+k][j+l];
                /*
                printf("sum = %d, originalImage(%d,%d) = %d\n", sum, i+k, j+l, (
int) originalImage[i+k][j+l]);
                */
            }
        }
        /*
        printf("gaussianImage(%d, %d) = %d\n", i, j, sum);
        */
```

Archive/segmentationOld.h

```
            gaussianImage[i][j] = sum;
            sum = 0;
        }
/*
        printf("Hit <RETURN> to continue: \n");
        getchar();
        getchar();
*/
        printf("Normalize...\n");

/* Normalize image to get rid of image brightness effect */
        for (i = sigma; i < sizeX-sigma; ++i)
        {
            for (j = sigma; j < sizeY-sigma; ++j)
            {
                if (gaussianImage[i][j] == 0)
                    originalImage[i][j] = (char) 0;
                else
                    originalImage[i][j] = (char) ( (int) originalImage[i][j]
                                                   * (int) originalImage[i][j]
                                                   / (int) gaussianImage[i][j]
                                                 );
            }
        }

/* Calculate laplacian operator. */
```

```
Archive/segmentationOld.h void laplacian(x, y, sizeX, sizeY)
    int x, y;                          /* (x,y) upper left corner of image  */
    int sizeX, sizeY;                  /* (x,y) size of image               */
{
    int sum, i, j;                     /* temp variables                    */

/*
     *    Get original image.
     */

/*    Initialize sobel image array.    */
    for (i = x; i < x+sizeX; ++i)
        for (j = y; j < y+sizeY; ++j)
            sobelImage[i][j] = (char) 0;

/*
     *    Perform Laplacian convolution.
     */
    printf("Performing Laplacian edge detection...\n");
    for (i = x+1; i <= x+sizeX-1; ++i)
    {
        for (j = y+1; j <= y+sizeY-1; ++j)
        {
            sum = ( 4*((int) originalImage[i][j])
                    - (int) originalImage[i-1][j]
                    - (int) originalImage[i][j-1]
                    - (int) originalImage[i+1][j]
                    - (int) originalImage[i][j+1]
                  );

/*
            printf("sum (%d, %d) = %d\n", i, j, sum);
            */
```

```
                                                        Archive/segmentationOld.h
                    if (sum < 0) sum = - sum;

sobelImage[i][j] = (char) sum;

sum = 0;
                }
            }
            /*          Store result in data file.       */
            fp4 = fopen("sobelSecond.raw", "w");
            for (i = x; i < x+sizeX; ++i)
                for (j = y; j < y+sizeY; ++j)
                    fprintf(fp4, "%c", sobelImage[i][j]);
            fclose(fp4);
        }

/* laplacian 5x5           */ void laplacian5(x, y, sizeX, sizeY)
    int x, y;                           /* (x,y) upper left corner of image        */
    int sizeX, sizeY;                   /* (x,y) size of image                     */
{
    int sum, i, j;                      /* temp variables                          */

/*          Get original image.
    */
    printf("Save original image to image file...\n");

/*          Initialize sobel image array.       */
```

Archive/segmentationOld.h

```
for (i = x; i < x+sizeX; ++i)
    for (j = y; j < y+sizeY; ++j)
        sobelImage[i][j] = (char) 0;

/*
        Perform Laplacian convolution.
*/
printf("Performing Laplacian edge detection...\n");

for (i = x+1; i <= x+sizeX-1; ++i)
    for (j = y+1; j <= y+sizeY-1; ++j)
    {
        sum = ( 8*((int) originalImage[i][j])
                - 4*((int) originalImage[i-1][j])
                - 4*((int) originalImage[i][j-1])
                - 4*((int) originalImage[i+1][j])
                - 4*((int) originalImage[i][j+1])
                + ((int) originalImage[i-1][j-1])
                + ((int) originalImage[i+1][j-1])
                + ((int) originalImage[i-1][j+1])
                + ((int) originalImage[i+1][j+1])
                + ((int) originalImage[i][j-2])
                + ((int) originalImage[i][j-2])
                + ((int) originalImage[i+2][j])
                + ((int) originalImage[i][j+2])
              );

/*
printf("sum (%d, %d) = %d\n", i, j, sum);
*/
        if (sum < 0) sum = - sum;

sobelImage[i][j] = (char) sum;
```

Archive/segmentationOld.h

```
            sum = 0;
        }
    }

/*      Store result in data file.      */ fp4 = fopen("sobel.raw", "w");
    for (i = x; i < x+sizeX; ++i)
        for (j = y; j < y+sizeY; ++j)
            fprintf(fp4, "%c", sobelImage[i][j]);
    fclose(fp4);

}
```

We claim:

1. A method of segmenting an original frame having blocks into a pertinent portion and a less pertinent portion comprising:
   acquiring a signal corresponding to the original frame which signal comprises an image attribute for each block;
   comparing the image attribute of each block to the image attribute of another block;
   assigning each block a focus measurement based at least in part on the attribute comparison, wherein the focus measurement is a function comprising a ratio of an estimate of an edge width and a magnitude of an edge focus gradient;
   comparing the focus measurement of each block to a threshold focus measurement;
   designating the blocks having a focus measurement above the threshold as focused and designating the blocks having a threshold measurement below the threshold as defocused; and
   creating a segmented frame based, at least in part, on the designations.

2. The method of claim 1 wherein the image attribute is a luminance component.

3. The method of claim 2 wherein each block comprises a single pel.

4. The method of claim 1 wherein the image attribute is compared with the image attribute of an adjacent block.

5. The method of claim 1 further comprising the step of smoothing the original frame signal.

6. The method of claim 5 wherein smoothing the frame signal comprises averaging the luminance component of a block with the luminance component of an adjacent block.

7. The method of claim 1 wherein comparing the image attribute comprises convolving a matrix of pels of a block with an impulse response array.

8. The method of claim 7 wherein the impulse response array is a Sobel response array.

9. The method of claim 8 wherein the focus measurement is inversely proportional to the edge width.

10. The method of claim 1 further comprising the step of calculating the threshold.

11. The method of claim 10 wherein threshold calculation is based on a selected percentage of the frame.

12. The method of claim 11 wherein the selected percentage is based on a bandwidth available for transmission.

13. The method of claim 1 further comprising creating an outline of the focused portions based on the designations wherein the segmented frame is created based at least in part on the outline.

14. The method of claim 1 further comprising:
   measuring the motion of each block;
   assigning each block a motion value based on the motion measurement;
   comparing the motion measurement of each block to a threshold motion measurement; and
   designating the blocks having a motion measurement above the motion threshold as moving and designating the blocks having a motion measurement below the motion threshold as not moving;
   wherein the segmented frame is created based, at least in part, on the motion designation.

15. The method of claim 14 further comprising:
   creating a focus template based on the focus designations;
   creating a motion template based on the motion designations; and
   creating a combined template based on the focus template and the motion template;
   wherein the segmented frame is created based on the combined template.

16. The method of claim 15 wherein the combined template is the intersection of the motion template and the focus template.

17. The method of claim 16 further comprising outlining the combined template and generating an outline signal, wherein the segmented frames are created based on the outline signal.

18. The method of claim 1 wherein the threshold focus measurement is a first threshold focus measurement further comprising:
   comparing the focus measurement of each block to a second threshold focus measurement; and
   designating the blocks having a focus measurement between the first threshold focus measurement and the second threshold focus measurement as intermediate;
   wherein the segmented frame is created based, at least in part, on the designations as focused, intermediate or defocused.

19. An apparatus for generating an output signal representing an outline of pertinent information in a video frame for use in compressing digital signals, said apparatus comprising:
   receiving means for receiving a digital signal, said received digital signal representing a plurality of blocks, each block having an image attribute;
   storage means for storing the image attribute of the blocks; and
   processing means for processing said received digital signal to generate said output signal, said processing means operable to:
   store at least a matrix of attributes;
   calculate a focus gradient based, at least in part, on the stored matrix;
   estimate an edge width;
   calculate a focus measurement that is function comprising a ratio of the focus gradient magnitude and the edge width;
   associate with each block a focus value based on the focus measurement;
   compare each focus value with a focus threshold;
   designate each block having a focus value above the focus threshold as focused;
   designate each block having a focus value below the focus threshold as defocused;
   define a focus outline based, at least in part, on the focused blocks.

20. The apparatus of claim 19 wherein the processing means is further operable to:
   define a focus template by designating the regions between the focused blocks as focused;
   calculate a motion gradient based, at least in part, on the stored matrix;
   associate with each block a motion value based on the motion gradient;
   compare each motion value with a motion threshold;
   designate each block having a motion value above the motion threshold as moving;
   designate each block having a motion value below the threshold as not moving;
   define a motion template based, at least in part, on the moving blocks; and define a motion/focus outline based on the focus template and the motion template.

21. The apparatus of claim 19 wherein the attribute is a luminance component.

22. The apparatus of claim 19 wherein the processing means is further operable to calculate the focus threshold.

23. The apparatus of claim 19 wherein the processing means is further operable to calculate the focus threshold based on a selected portion of the video frame.

24. The apparatus of claim 19 wherein the processing means is further operable to calculate the focus threshold based on a predetermined bandwidth.

25. A prefilter for segmenting a motion video frame into more pertinent and less pertinent portions comprising:

means for receiving a signal corresponding to an original frame of motion video, the original frame signal having portions, wherein each portion has a depth, and wherein each portion contains an image having an edge characterized by a width and a focus gradient;

means for measuring the depth of each portion of the original frame signal, wherein the depth measurement is a measure of a degree of focus of the portion, and wherein the degree of focus is determined as a function of edge characteristics, the means for measuring including;

means for estimating the edge width, means for focus gradient magnitude, and means for generating a function comprising a ratio of the focus gradient magnitude and the edge width;

means for designating each portion as foreground or background based, at least in part, on the depth measurement;

means for generating a template based, at least in part, on the designations;

means for generating a template signal corresponding to the template; and means for combining the original frame signal and the template signal into a segmented frame signal.

26. The prefilter of claim 25 wherein the template is a focus template and further comprising:

means for measuring the motion of each portion of the original frame signal;

means for designating each portion either as moving or nonmoving based, at least in part, on the motion measurement;

means for generating a motion template based, at least in part, on the motion designations;

means for generating a motion template signal corresponding to the motion template;

means for comparing the motion template signal and the focus template signal to derive a combined motion/focus template signal; and means for combining the original frame signal and the motion/focus template signal into a combined segmented frame signal.

27. The prefilter of claim 25 wherein the means for generating a template comprises:

means for designating each portion of the frame signal disposed between foreground portions located at one horizontal level as foreground; and means for designating each portion of the frame signal disposed between foreground portions located at one vertical level as foreground.

28. The prefilter of claim 25 wherein the means for generating a template signal comprises means for generating a signal corresponding to an outline of the template.

29. A method of generating a signal corresponding to a segmented frame comprising:

acquiring a signal corresponding to an original frame signal comprises an image attribute for each pel;

comparing the image attribute of each pel to the image attribute of another pel;

detecting edges in the original signal based on the attribute comparison, wherein the attribute comparison provides an estimate of a focus gradient magnitude and width in which the edge are detected as a function comprising a ratio of the focus gradient magnitude and edge width;

designating the pels located at edges as focused;

designating the pels not located at edges as defocused;

generating a signal corresponding to the focused pels; and creating a segmented frame signal based on the focused pel signal and the original frame signal.

30. The method of claim 29 further comprising:

comparing each pel to a corresponding pel in a different frame;

measuring the movement of each pel based on the comparison;

comparing the movement measurement with a movement threshold, designating pels with a movement measurement above the threshold as moving, and designating the pels with a movement measurement below the threshold as nonmoving; and generating a signal corresponding to the moving pels;

wherein the segmented frame signal is further based on the moving pel signal.

31. A method of segmenting an original frame having blocks into a pertinent portion and a less pertinent portion comprising:

acquiring a signal corresponding to the original frame which signal comprises an image attribute for each block;

comparing the image attribute of each block to the image attribute of another block;

assigning each block a focus measurement based at least in part on the attribute comparison, wherein the focus measurement comprises an estimate of edge width;

comparing the focus measurement of each block to a threshold focus measurement;

designating the blocks having a focus measurement above the threshold as focused and designating the blocks having a threshold measurement below the threshold as defocused;

measuring the motion of each block;

assigning to each block a motion value based on the motion measurement;

comparing the motion measurement of each block to a threshold motion measurement;

designating the blocks having a motion measurement above the motion threshold as moving and designating the blocks having a motion measurement below the motion threshold as not moving; and creating a segmented frame based on the focus and motion designations.

32. The method of claim 31 further comprising:

creating a focus template based on the focus designations;

creating a motion template based on the motion designations; and creating a combined template based on the focus template and the motion template.

33. The method of claim 32 wherein the combined template is the intersection of the motion template and the focus template.

34. The method of claim 33 further comprising outlining the combined template and generating an outline signal, wherein the segmented frames are created based on the outline signal.

35. An apparatus for generating an output signal representing an outline of pertinent information in a video frame for use in compressing digital signals, said apparatus comprising:

receiving means for receiving a digital signal, said received digital signal representing a plurality of blocks, each block having an image attribute;

storage means for storing the image attribute of the blocks; and processing means for processing said received digital signal to generate said output signal, said processing means operable to:
store at least a matrix of attributes;
calculate a focus gradient based, at least in part, on the stored matrix;
associate with each block a focus value based on the focus gradient and on estimate of edge width;
compare each focus value with a focus threshold;
designate each block having a focus value above the focus threshold as focused;
designate each block having a focus value below the focus threshold as defocused;
define a focus outline based, at least in part, on the focused blocks;
define a focus template by designating the regions between the focused blocks as focused;
calculate a motion gradient based, at least in part, on the stored matrix;
associate with each block a motion value based on the motion gradient;
compare each motion value with a motion threshold;
designate each block having a motion value above the motion threshold as moving;
designate each block having a motion value below the threshold as not moving;
define a motion template based, at least in part, on the moving blocks; and
define a motion/focus outline based on the focus template and the motion template.

36. A prefilter for segmenting a motion video frame into more pertinent and less pertinent portions comprising:

means for receiving a signal corresponding to an original frame, the original frame signal having portions, wherein each portion has a depth, means for measuring the depth of each portion of the original frame signal based in part on an estimate of edge width;

means for designating each portion as foreground or background based, at least in part, on the depth measurement;

means for generating a focus template based, at least in part, on the designations;

means for generating a focus template signal corresponding to the focus template;

means for measuring the motion of each portion of the original frame signal;

means for designating each portion either as moving or nomoving based, at least in part, on the motion measurement;

means for generating a motion template based, at least in part, on the motion designations;

means for generating a motion template signal corresponding to the motion template;

means for comparing the motion template signal and the focus template signal to derive a combined motion/focus template signal; and means for combining the original frame signal and the combined motion/focus template signal into a combined segmented frame signal.

37. A method of generating a signal corresponding to a segmented frame comprising:

acquiring a signal corresponding to an original frame which original frame signal comprises an image attribute for each pel;

comparing the image attribute of each pel to the image attribute of another pel;

detecting edges in the original frame signal based on the attribute comparison, wherein the attribute comparison provides an estimate of edge width;

designating the pels located at the edges as focused;

designating the pels not located at edges as defocused;

generating a signal corresponding to the focused pels;

comparing each pel to a corresponding pel in a different frame;

measuring the movement of each pel based on the comparison;

comparing the movement measurement with a movement threshold, designating pels with a movement measurement above the threshold as moving, and designating the pels with a movement measurement below the threshold as nonmoving;

generating a signal corresponding to the moving pels; and creating a segmented frame signal based on the focused pel signal, the moving pel signal and the original frame signal.

* * * * *